(12) United States Patent
Wang et al.

(10) Patent No.: US 11,490,364 B2
(45) Date of Patent: Nov. 1, 2022

(54) RESOURCE INDICATION METHOD AND APPARATUS

(71) Applicant: Huawei Technologies Co., Ltd., Shenzhen (CN)

(72) Inventors: Ting Wang, Shanghai (CN); Yuanjie Li, Shanghai (CN); Hao Tang, Shanghai (CN); Fan Wang, Berkshire (GB); Zhenfei Tang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/672,046

(22) Filed: Nov. 1, 2019

(65) Prior Publication Data

US 2020/0068535 A1 Feb. 27, 2020

Related U.S. Application Data

(63) Continuation of application No. PCT/CN2018/085708, filed on May 4, 2018.

(30) Foreign Application Priority Data

May 4, 2017 (CN) .......................... 201710309345.9

(51) Int. Cl.
*H04W 72/02* (2009.01)
*H04W 72/04* (2009.01)
*H04W 72/12* (2009.01)

(52) U.S. Cl.
CPC ......... *H04W 72/02* (2013.01); *H04W 72/042* (2013.01); *H04W 72/0446* (2013.01); *H04W 72/0453* (2013.01); *H04W 72/1273* (2013.01)

(58) Field of Classification Search
CPC .................. H04W 72/042; H04W 72/0446
See application file for complete search history.

(56) References Cited

U.S. PATENT DOCUMENTS

| | | | |
|---|---|---|---|
| 8,942,083 | B2 | 1/2015 | Choi et al. |
| 2008/0109041 | A1 | 5/2008 | de Voir |

(Continued)

FOREIGN PATENT DOCUMENTS

| | | |
|---|---|---|
| CN | 106358297 A | 1/2017 |
| CN | 106385709 A | 2/2017 |

(Continued)

OTHER PUBLICATIONS

3rd Generation Partnership Project; Technical Specification Group Radio Access Network; NR; Radio Resource Control (RRC); Protocol specification (Release 15), 3GPP TS 38.331 V0.0.2, Mar. 2017, 13 pages.

(Continued)

*Primary Examiner* — Hassan Kizou
*Assistant Examiner* — Hector Reyes
(74) *Attorney, Agent, or Firm* — Slater Matsil, LLP

(57) ABSTRACT

A resource indication method and an apparatus are provided, to increase a data reception success rate of a terminal. The method includes: receiving, by a terminal, first indication information from a base station, where the first indication information is used to indicate a resource configuration for a downlink data transmission, the resource configuration includes a time scheduling unit aggregation level and a time domain location in a single time scheduling unit, and the aggregation level represents a quantity of time scheduling units included in a resource for the downlink data transmission; and determining, by the terminal, that a time domain resource in the single time scheduling unit is valid for each time scheduling unit of one or more time scheduling unit a quantity of which is represented by the aggregation level, and receiving the downlink data transmission accordingly.

31 Claims, 8 Drawing Sheets

(56) References Cited

U.S. PATENT DOCUMENTS

| | | | |
|---|---|---|---|
| 2014/0092830 A1* | 4/2014 | Chen | H04W 72/0446 370/329 |
| 2014/0301359 A1 | 10/2014 | Seo et al. | |
| 2017/0289899 A1* | 10/2017 | You | H04W 48/12 |
| 2017/0290046 A1* | 10/2017 | Sun | H04J 11/0036 |
| 2018/0213530 A1* | 7/2018 | Mochizuki | H04W 72/12 |
| 2018/0279304 A1* | 9/2018 | Lee | H04W 72/042 |
| 2018/0309513 A1* | 10/2018 | Kim | H04B 7/2643 |
| 2019/0082441 A1* | 3/2019 | Liu | H04L 1/08 |
| 2019/0090258 A1* | 3/2019 | Ryu | H04B 7/0632 |
| 2019/0200355 A1* | 6/2019 | Baldemair | H04W 72/0453 |
| 2020/0045771 A1* | 2/2020 | Sano | H04W 72/0446 |

FOREIGN PATENT DOCUMENTS

| | | |
|---|---|---|
| EP | 2469744 A2 | 6/2012 |
| EP | 2635082 A1 | 9/2013 |
| EP | 2765724 A2 | 8/2014 |
| EP | 3116276 A4 | 4/2017 |
| GB | 2471284 A | 12/2010 |
| WO | 2015158056 A1 | 10/2015 |
| WO | 2016171400 A1 | 10/2016 |

OTHER PUBLICATIONS

Huawei, et al., "WF on resource allocation for data transmission," 3GPP TSG RAN WG1 Meeting #88, R1-1703781, Athens, Greece, Feb. 13-17, 2017, 2 pages.

Intel, "On slot aggregation for data transmission," 3GPP TSG RAN WG1 #88b R1-1704767, Mar. 25, 2017, 5 pages.

* cited by examiner

RESOURCE INDICATION METHOD AND APPARATUS

CROSS-REFERENCE TO RELATED APPLICATIONS

This application is a continuation of International Application No. PCT/CN2018/085708, filed on May 4, 2018, which claims priority to Chinese Patent Application No. 201710309345.9, filed on May 4, 2017. The disclosures of the aforementioned applications are hereby incorporated herein by reference in their entireties.

TECHNICAL FIELD

Embodiments of the present invention relate to the field of communications technologies, and in particular, to a resource indication method and an apparatus.

BACKGROUND

Referring to FIG. 1, in a long term evolution (Long Term Evolution, LTE) system, a physical downlink control channel (Physical Downlink Control Channel, PDCCH) occupies entire bandwidth in frequency domain and may occupy first one to four symbols in a subframe in time domain, and a physical downlink shared channel (Physical Downlink Sharing Channel, PDSCH) occupies a next symbol after the symbols occupied by the PDCCH in time domain. In FIG. 1, a subframe is used as a scheduling unit.

It can be learned that in the LTE system, a terminal can know a location of a starting symbol of the PDSCH based on a quantity, indicated in a physical control format indicator channel (Physical Control Format Indicator Channel, PCFICH), of symbols occupied by the PDCCH, and an ending symbol of the PDSCH is considered as the last symbol in the subframe by default.

However, in a 5th generation mobile communications technology (5G) new radio (New Radio, NR) system, a downlink control channel is transmitted on some frequency domain resources (Bandwidth part, BP), and a time domain symbol occupied by the downlink control channel also dynamically changes. Therefore, in the NR system, a starting location of the time domain location of a downlink data channel may be the first symbol, and a time domain ending symbol of the downlink data channel is unnecessarily the last symbol. In other words, in the NR system, there is a plurality of possible time domain resource locations for the downlink data channel. In this case, a terminal cannot determine, according to the method applied to LTE, a time domain resource location occupied by the downlink data channel, and consequently cannot receive data at a correct location.

SUMMARY

Embodiments of the present invention provide a resource indication method and an apparatus, to improve data reception performance of a terminal.

According to a first aspect, a resource indication method is provided, where the method may be performed by a terminal. The method includes: receiving, by the terminal, first indication information from a base station, where the first indication information is used to indicate a resource configuration for a downlink data transmission, the resource configuration includes a time scheduling unit aggregation level and a time domain location in a single time scheduling unit, and the aggregation level represents a quantity of time scheduling units included in a resource for the downlink data transmission; and determining, by the terminal, that a time domain resource in the single time scheduling unit is valid for each time scheduling unit of one or more time scheduling unit a quantity of which is represented by the aggregation level, and receiving the downlink data transmission accordingly.

In this embodiment of the present invention, the terminal may receive the first indication information from the base station. The first indication information may indicate the resource configuration for the downlink data transmission, the resource configuration includes the time domain location in the single time scheduling unit, and the time domain resource in the single time scheduling unit is valid for each time scheduling unit of one or more time scheduling unit a quantity of which is represented by the aggregation level. In other words, the first indication information indicates a time domain location occupied by the downlink data. Therefore, the terminal can determine a specific time domain location at which the terminal needs to receive the downlink data. This increases a data reception success rate.

In addition, the first indication information indicates the time domain location in the single time scheduling unit, and the time domain resource in the single time scheduling unit is valid for each time scheduling unit of one or more time scheduling unit a quantity of which is represented by the aggregation level. To be specific, a time domain location occupied by the downlink data in each time scheduling unit of one or more time scheduling unit a quantity of which is represented by the aggregation level is indicated by using the time domain location in the single time scheduling unit, without separately indicating time domain locations occupied by the downlink data in all time scheduling units, thereby effectively reducing signaling overheads.

In a possible design, an indication unit of the time domain location is a plurality of time domain symbols, and the time domain symbol is a smallest time domain transmission unit for the downlink data transmission.

For example, a value of the indication unit used in the first indication information is 1, but the indication unit is actually two symbols. In this case, two symbols are indicated by using one indication unit. It can be learned that the first indication information can indicate a relatively large time domain range by using only relatively low overheads. This can effectively reduce signaling overheads.

In a possible design, the terminal may further receive second indication information from the base station, where the second indication information is used to indicate a quantity of time domain symbols included in the indication unit of the time domain location.

The terminal may use different manners to determine the quantity of time domain symbols included in the indication unit.

For example, the terminal may determine the indication unit according to a system default configuration or a protocol specification. The system default configuration or the protocol specification may be in different forms. For example, a protocol may specify a frame structure parameter referenced by the indication unit, where the frame structure parameter may be understood as a specific subcarrier spacing. Alternatively, a protocol may directly specify the quantity of symbols included in the indication unit. For example, if the protocol specifies that the indication unit includes two symbols, the terminal knows a length of the indication unit based on a frame structure parameter of the downlink data. In this manner, the indication unit is determined without excessive interactions between the base station and the terminal, thereby reducing signaling overheads. Alternatively, the base station notifies the terminal of a length of the indication unit by using signaling. For example, the base station sends the second indication information to the terminal, where the second indication information is used to notify the terminal of the quantity of symbols included in the indication unit, and then the terminal knows the length of the indication unit based on the second indication information. This manner is relatively simple and direct. The first indication information and the second indication information may be same indication information, or may be different fields included in one piece of signaling, or may be information sent by using different signaling. This is not limited in this embodiment of the present invention.

In a possible design, the first indication information is indication information obtained by performing joint coding on a starting location of the time domain location and a time domain ending location in the single time scheduling unit and the aggregation level; or the first indication information is indication information obtained by performing joint coding on a starting location of the time domain location and a quantity of occupied indication units in the single time scheduling unit and the aggregation level.

To be specific, the time domain location in the single time scheduling unit may be the starting location of the time domain location and the time domain ending location in the single time scheduling unit, or may be the starting location of the time domain location and the quantity of occupied indication units in the single time scheduling unit. By using either of the two time domain locations, the starting location of the time domain location and the time domain ending location in the single time scheduling unit can be simply and directly determined. In addition, in this embodiment of the present invention, the base station may further perform joint coding for the first indication information, and first indication information obtained after the joint coding occupies a relatively small quantity of bits, that is, a relatively large amount of information can be indicated by using the relatively small quantity of bits. This can further reduce signaling overheads.

In a possible design, the terminal may further finally determine the time domain location in the time scheduling unit based on a time scheduling unit type and the first indication information. For example, the method is determining, by the terminal, a type of each time scheduling unit included in one or more time scheduling unit a quantity of which is represented by the aggregation level; determining, by the terminal based on the type of each time scheduling unit, a time domain location that allows to be used for the downlink data transmission in each time scheduling unit, and determining, based on the first indication information, a time domain location that is scheduled for the downlink data transmission in each time scheduling unit; and determining, by the terminal, that an intersection set of the two determined time domain locations is a time domain location that is actually used for the downlink data transmission in each time scheduling unit.

For example, if the time scheduling unit type is a self-contained type, it is possible that not all symbols in the time scheduling unit can be used for the downlink data transmission. Therefore, if the time domain location indicated by the first indication information includes symbols that cannot be used for the downlink data transmission, the terminal apparently cannot receive the downlink data on these symbols. In view of this, in this embodiment of the present invention, the terminal may further finally determine the time domain location in the time scheduling unit based on the time scheduling unit type and the first indication information. For example, if information for indicating the time scheduling unit type indicates that the first symbol to the fifth symbol in a slot are downlink transmission symbols, and the first indication information indicates that the second symbol to the sixth symbol in the slot are a time domain location for the downlink data transmission, the terminal may determine that a time domain location of the downlink data in the slot is the second symbol to the fifth symbol. The time scheduling unit type is indicated, so that the terminal can more accurately determine the time domain location for the downlink data transmission, and is prevented from listening to the downlink data at a location at which the downlink data cannot be transmitted, thereby reducing power consumption of the terminal.

In a possible design, when determining, based on the time domain location in the single time scheduling unit, that the downlink data is discontinuous in time domain, the terminal determines that during mapping, frequency domain mapping is performed on the downlink data before time domain mapping.

There is a specific mapping rule for mapping the downlink data by the base station. The mapping rule is used to indicate that during mapping, whether frequency domain mapping is performed on the downlink data before time domain mapping, or time domain mapping is performed on the downlink data before frequency domain mapping. Therefore, the terminal needs to know the mapping rule, so as to demodulate the downlink data. For example, the base station may choose to directly indicate the mapping rule for the downlink data to the terminal, and then the terminal can directly determine the mapping rule. This is relatively simple. Alternatively, the base station does not need to specially indicate the mapping rule to the terminal, and the terminal can determine the mapping rule based on characteristics/a characteristic of a time domain resource and/or a frequency domain resource that are/is allocated for the downlink data. In this manner, no excessive signaling interactions are required between the base station and the terminal, so that signaling overheads can be reduced. If this manner is used, the terminal and the base station need to determine the mapping rule in the same manner. For example, a default mapping rule is: If the downlink data is discontinuous in time domain, determining that during mapping, frequency domain mapping is performed on the downlink data before time domain mapping. For another example, another default mapping rule is: If the downlink data is discontinuous in frequency domain, determining that during mapping, time domain mapping is performed on the downlink data before frequency domain mapping. By using the two mapping rules, discontinuous resource mapping locations can be reduced, to ensure resource mapping continuity as much as possible, and reduce implementation complexity of the base station and the terminal.

According to a second aspect, a resource indication method is provided, where the method may be performed by a base station. The method includes: sending, by the base station, first indication information to a terminal, where the first indication information is used to indicate a resource configuration for a downlink data transmission, the resource configuration includes a time scheduling unit aggregation level and a time domain location in a single time scheduling unit, and the aggregation level represents a quantity of time scheduling units included in a resource for the downlink data transmission; and determining, by the base station, that a time domain resource in the single time scheduling unit is valid for each time scheduling unit of one or more time scheduling unit a quantity of which is represented by the aggregation level, and transmitting the downlink data accordingly.

In a possible design, an indication unit of the time domain location is a plurality of time domain symbols, and the time domain symbol is a smallest time domain transmission unit for the downlink data transmission.

In a possible design, the base station further sends second indication information to the terminal, where the second indication information is used to indicate a quantity of time domain symbols included in the indication unit of the time domain location.

In a possible design, the base station performs joint coding on a starting location of the time domain location and a time domain ending location in the single time scheduling unit and the aggregation level, to obtain the first indication information; or the base station performs joint coding on a starting location of the time domain location and a quantity of occupied indication units in the single time scheduling unit and the aggregation level, to obtain the first indication information.

In a possible design, when determining, based on the time domain location in the single time scheduling unit, that the downlink data is discontinuous in time domain, the base station determines to perform, during mapping, frequency domain mapping on the downlink data before time domain mapping.

According to a third aspect, a resource indication method is provided, where the method may be performed by a terminal. The method includes: receiving, by the terminal, first indication information from a base station, where the first indication information is used to indicate a resource configuration for a downlink data transmission, the resource configuration includes a time scheduling unit aggregation level and a time domain location in all time scheduling units a quantity of which is represented by the aggregation level, and the aggregation level represents a quantity of time scheduling units included in a resource for the downlink data transmission; and receiving, by the terminal, the downlink data transmission accordingly.

If the resource configuration includes the time domain location in all the time scheduling units, the resource configuration still includes only one time domain location. Herein, "one" is described relative to "a plurality of". For example, a time domain location in a single time scheduling unit may be understood as one time domain location. Then, if time domain locations in all the time scheduling units are separately indicated, it is equivalent that the resource configuration needs to include a plurality of time domain locations. Signaling overheads required by one time domain location are apparently lower than signaling overheads required by a plurality of time domain locations. In other words, the time domain locations in all the time scheduling units can be indicated by using only one time domain location. This apparently can effectively reduce signaling overheads compared with a case in which the time domain locations in all the time scheduling units are separately indicated.

In a possible design, an indication unit of the time domain location is a plurality of time domain symbols, and the time domain symbol is a smallest time domain transmission unit for the downlink data transmission.

In a possible design, the terminal receives second indication information from the base station, where the second indication information is used to indicate a quantity of time domain symbols included in the indication unit of the time domain location.

In a possible design, the first indication information is indication information obtained by performing joint coding on a starting location of the time domain location and a time domain ending location in all the time scheduling units and the aggregation level; or the first indication information is indication information obtained by performing joint coding on a starting location of the time domain location and a quantity of occupied indication units in all the time scheduling units and the aggregation level.

In a possible design, the terminal determines a type of each time scheduling unit included in one or more time scheduling unit a quantity of which is represented by the aggregation level; the terminal determines, based on the type of each time scheduling unit, a time domain location that allows to be used for the downlink data transmission in each time scheduling unit, and determines, based on the first indication information, a time domain location that is scheduled for the downlink data transmission in each time scheduling unit; and the terminal determines that an intersection set of the two determined time domain locations is a time domain location that is actually used for the downlink data transmission in each time scheduling unit.

In a possible design, when determining, based on the time domain location in the single time scheduling unit, that the downlink data is discontinuous in time domain, the terminal determines that during mapping, frequency domain mapping is performed on the downlink data before time domain mapping.

According to a fourth aspect, a resource indication method is provided, where the method may be performed by a base station. The method includes: sending, by the base station, first indication information to a terminal, where the first indication information is used to indicate a resource configuration for a downlink data transmission, the resource configuration includes a time scheduling unit aggregation level and a time domain location in all time scheduling units a quantity of which is represented by the aggregation level, and the aggregation level represents a quantity of time scheduling units included in a resource for the downlink data transmission; and transmitting, by the base station, the downlink data accordingly.

In a possible design, an indication unit of the time domain location is a plurality of time domain symbols, and the time domain symbol is a smallest time domain transmission unit for the downlink data transmission.

In a possible design, the base station sends second indication information to the terminal, where the second indication information is used to indicate a quantity of time domain symbols included in the indication unit of the time domain location.

In a possible design, the base station performs joint coding on a starting location of the time domain location and a time domain ending location in all the time scheduling units and the aggregation level, to obtain the first indication information; or the base station performs joint coding on a starting location of the time domain location and a quantity of occupied indication units in all the time scheduling units and the aggregation level, to obtain the first indication information.

In a possible design, when determining, based on the time domain location in the single time scheduling unit, that the downlink data is discontinuous in time domain, the base station determines to perform, during mapping, frequency domain mapping on the downlink data before time domain mapping.

According to a fifth aspect, a communications apparatus is provided. The communications apparatus has functions of the terminal for implementing the foregoing method designs. These functions may be implemented by using hardware, or may be implemented by hardware by executing corresponding software. The hardware or the software includes one or more units corresponding to the functions.

In a possible design, a specific structure of the communications apparatus may include a processing unit and a receiving unit. The processing unit and the receiving unit may perform corresponding functions in the method provided in any one of the first aspect or the possible designs of the first aspect.

According to a sixth aspect, a communications apparatus is provided. The communications apparatus has functions of the base station for implementing the foregoing method designs. These functions may be implemented by using hardware, or may be implemented by hardware by executing corresponding software. The hardware or the software includes one or more units corresponding to the functions.

In a possible design, a specific structure of the communications apparatus may include a processing unit and a sending unit. The processing unit and the sending unit may perform corresponding functions in the method provided in any one of the second aspect or the possible designs of the second aspect.

According to a seventh aspect, a communications apparatus is provided. The communications apparatus has functions of the terminal for implementing the foregoing method designs. These functions may be implemented by using hardware, or may be implemented by hardware by executing corresponding software. The hardware or the software includes one or more units corresponding to the functions.

In a possible design, a specific structure of the communications apparatus may include a processing unit and a receiving unit. The processing unit and the receiving unit may perform corresponding functions in the method provided in any one of the third aspect or the possible designs of the third aspect.

According to an eighth aspect, a communications apparatus is provided. The communications apparatus has functions of the base station for implementing the foregoing method designs. These functions may be implemented by using hardware, or may be implemented by hardware by executing corresponding software. The hardware or the software includes one or more units corresponding to the functions.

In a possible design, a specific structure of the communications apparatus may include a processing unit and a sending unit. The processing unit and the sending unit may perform corresponding functions in the method provided in any one of the fourth aspect or the possible designs of the fourth aspect.

According to a ninth aspect, a communications apparatus is provided. The communications apparatus may be a terminal or a function module disposed in the terminal. The communications apparatus includes a receiver and a processor, and the processor and the receiver are coupled, for example, are connected by using a bus. The processor and the receiver can cooperatively perform the method performed by the terminal in any one of the first aspect or the possible designs of the first aspect.

According to a tenth aspect, a communications apparatus is provided. The communications apparatus may be a base station or a function module disposed in the base station. The communications apparatus includes a transmitter and a processor, and the processor and the transmitter are coupled, for example, are connected by using a bus. The processor and the transmitter can cooperatively perform the method performed by the base station in any one of the second aspect or the possible designs of the second aspect.

According to an eleventh aspect, a communications apparatus is provided. The communications apparatus may be a terminal or a function module disposed in the terminal. The communications apparatus includes a receiver and a processor, and the processor and the receiver are coupled, for example, are connected by using a bus. The processor and the receiver can cooperatively perform the method performed by the terminal in any one of the third aspect or the possible designs of the third aspect.

According to a twelfth aspect, a communications apparatus is provided. The communications apparatus may be a base station or a function module disposed in the base station. The communications apparatus includes a transmitter and a processor, and the processor and the transmitter are coupled, for example, are connected by using a bus. The processor and the transmitter can cooperatively perform the method performed by the base station in any one of the fourth aspect or the possible designs of the fourth aspect.

According to a thirteenth aspect, a communications apparatus is provided. The communications apparatus may be a terminal or a chip disposed in the terminal. The communications apparatus includes a memory configured to store computer executable program code, a communications interface, and a processor. The processor is coupled to the memory and the communications interface. The program code stored in the memory includes an instruction, and when the processor executes the instruction, the instruction causes the communications apparatus to perform the method performed by the terminal in any one of the first aspect or the possible designs of the first aspect.

According to a fourteenth aspect, a communications apparatus is provided. The communications apparatus may be a base station or a chip disposed in the base station. The communications apparatus includes a memory configured to store computer executable program code, a communications interface, and a processor. The processor is coupled to the memory and the communications interface. The program code stored in the memory includes an instruction, and when the processor executes the instruction, the instruction causes the communications apparatus to perform the method performed by the base station in any one of the second aspect or the possible designs of the second aspect.

According to a fifteenth aspect, a communications apparatus is provided. The communications apparatus may be a terminal or a chip disposed in the terminal. The communications apparatus includes a memory configured to store computer executable program code, a communications interface, and a processor. The processor is coupled to the memory and the communications interface. The program code stored in the memory includes an instruction, and when the processor executes the instruction, the instruction causes the communications apparatus to perform the method performed by the terminal in any one of the third aspect or the possible designs of the third aspect.

According to a sixteenth aspect, a communications apparatus is provided. The communications apparatus may be a base station or a chip disposed in the base station. The communications apparatus includes a memory configured to store computer executable program code, a communications interface, and a processor. The processor is coupled to the memory and the communications interface. The program code stored in the memory includes an instruction, and when the processor executes the instruction, the instruction causes the communications apparatus to perform the method performed by the base station in any one of the fourth aspect or the possible designs of the fourth aspect.

According to a seventeenth aspect, a computer storage medium is provided. The computer storage medium is configured to store a computer software instruction used by the communications apparatus described in the fifth aspect, the communications apparatus described in the ninth aspect, or the communications apparatus described in the thirteenth aspect, and includes a program designed for the terminal to perform the method in any one of the first aspect or the possible designs of the first aspect.

According to an eighteenth aspect, a computer storage medium is provided. The computer storage medium is configured to store a computer software instruction used by the communications apparatus described in the sixth aspect, the communications apparatus described in the tenth aspect, or the communications apparatus described in the fourteenth aspect, and includes a program designed for the base station to perform the method in any one of the second aspect or the possible designs of the second aspect.

According to a nineteenth aspect, a computer storage medium is provided. The computer storage medium is configured to store a computer software instruction used by the communications apparatus described in the seventh aspect, the communications apparatus described in the eleventh aspect, or the communications apparatus described in the fifteenth aspect, and includes a program designed for the terminal to perform the method in any one of the third aspect or the possible designs of the third aspect.

According to a twentieth aspect, a computer storage medium is provided. The computer storage medium is configured to store a computer software instruction used by the communications apparatus described in the eighth aspect, the communications apparatus described in the twelfth aspect, or the communications apparatus described in the sixteenth aspect, and includes a program designed for the base station to perform the method in any one of the fourth aspect or the possible designs of the fourth aspect.

According to a twenty-first aspect, a computer program product including an instruction is provided. When the instruction runs on a computer, the computer performs the method in any one of the first aspect or the possible designs of the first aspect.

According to a twenty-second aspect, a computer program product including an instruction is provided. When the instruction runs on a computer, the computer performs the method in any one of the second aspect or the possible designs of the second aspect.

According to a twenty-third aspect, a computer program product including an instruction is provided. When the instruction runs on a computer, the computer performs the method in any one of the third aspect or the possible designs of the third aspect.

According to a twenty-fourth aspect, a computer program product including an instruction is provided. When the instruction runs on a computer, the computer performs the method in any one of the fourth aspect or the possible designs of the fourth aspect.

In the embodiments of the present invention, a relatively large time domain range can be indicated by using a relatively small quantity of bits. This effectively reduces signaling overheads.

DETAILED DESCRIPTION OF ILLUSTRATIVE EMBODIMENTS

Figure 1:
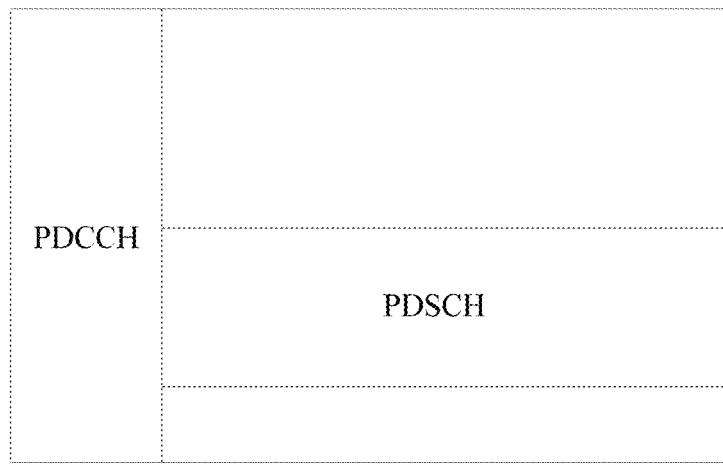
FIG. 1 is a schematic diagram of a resource location occupied by a PDSCH in an LTE system.

To make the objectives, technical solutions, and advantages of the embodiments of the present invention clearer, the following further describes the embodiments of the present invention in detail with reference to the accompanying drawings.

The technical solutions provided in this specification may be applied to a 5G NR system (briefly referred to as an NR system below), and may also be used in a next-generation mobile communications system or another similar mobile communications system.

The following interprets some terms in the embodiments of the present invention, to help a person skilled in the art have a better understanding.

(1) A terminal is a device that provides a user with voice and/or data connectivity. For example, the terminal may include a handheld device having a wireless connection function, or a processing device connected to a wireless modem. The terminal may communicate with a core network by using a radio access network (Radio Access Network, RAN), and exchange voice and/or data with the RAN. The terminal may include an access point (Access Point, AP), user equipment (User Equipment, UE), a wireless terminal, a mobile terminal, a subscriber unit (Subscriber Unit), a subscriber station (Subscriber Station), a mobile station (Mobile Station), a mobile console (Mobile), a remote station (Remote Station), an access point (Access Point, AP), a remote terminal (Remote Terminal), an access terminal (Access Terminal), a user terminal (User Terminal), a user agent (User Agent), a user device (User Device), or the like. For example, the terminal may include a mobile phone (or referred to as a "cellular" phone), a computer having a mobile terminal, a portable, pocket-sized, handheld, computer built-in, or vehicle-mounted mobile apparatus, or a smart wearable device. For example, the terminal may be a device such as a personal communications service (Personal Communication Service, PCS) phone, a cordless telephone set, a session initiation protocol (SIP) phone, a wireless local loop (Wireless Local Loop, WLL) station, a personal digital assistant (Personal Digital Assistant, PDA), a smartwatch, a smart helmet, smart glasses, or a smart band.

(2) A network device includes, for example, a base station (for example, an access point), and may be a device that communicates with a wireless terminal through one or more sectors over an air interface in an access network. The base station may be configured to mutually convert a received over-the-air frame and an Internet protocol (IP) packet, and serve as a router between the terminal and a remaining portion of the access network. The remaining portion of the access network may include an IP network. The base station may further coordinate attribute management of the air interface. For example, the base station may include an evolved NodeB (eNB or e-NodeB, evolutional Node B) in an LTE system or an LTE-advanced (LTE-Advanced, LTE-A) system, or a small cell (micro/pico eNB) in an LTE system or an LTE-A system; may include a next generation NodeB (next generation node B, gNB) in an NR system, or a transmission point (transmission point, TP); or may be a transmission/reception node (transmission and receiver point, TRP). This is not limited in the embodiments of the present invention.

(3) A time scheduling unit, namely, a time scheduling measurement unit, is, for example, a slot (slot), a radio frame, a subframe, or a mini-slot (mini-slot). This is not limited in the embodiments of the present invention. The time scheduling unit may include one or more smallest time domain transmission units. The smallest time domain transmission unit, also referred to as a time domain symbol, is a smallest time domain transmission unit for transmitting downlink data. For example, the smallest time domain transmission unit is an orthogonal frequency division multiplexing (Orthogonal Frequency Division Multiplexing, OFDM) symbol. The OFDM symbol is briefly referred to as a symbol below.

(4) A time domain granularity, also referred to as an indication unit of a time domain location or briefly referred to as an indication unit, is a smallest indication unit that is used when first indication information in the embodiments of the present invention indicates a time domain location. A length of the indication unit is an integer multiple of a length of a smallest time domain unit for transmitting downlink data. The smallest time domain unit may also be referred to as a time domain symbol, for example, is specifically an OFDM symbol. In this case, the indication unit may be one symbol, two symbols, three symbols, or the like.

(5) An aggregation level represents a quantity of time scheduling units included in a resource for transmitting downlink data. Specifically, a base station transmits the downlink data by using a plurality of time scheduling units, that is, transmits the downlink data through time scheduling unit aggregation. Therefore, a quantity of time scheduling units participating in aggregation is referred to as the aggregation level. For example, if the aggregation level is 2, it indicates that the base station transmits the downlink data by using two time scheduling units. Time scheduling units included in one aggregation level may be continuous or discontinuous in time domain, and one aggregation level may include one or more types of time scheduling units. This is not limited herein.

(6) A downlink control channel is used to carry control information. Specific types of downlink control channels are not limited in this specification. For example, the types of downlink control channels include a PDCCH or an enhanced physical downlink control channel (Enhanced Physical Downlink Control Channel, EPDCCH), and may further include another downlink control channel used to transmit control information.

(7) A downlink data channel is used to carry data. Specific types of downlink data channels are not limited in this specification. For example, the types of downlink data channels include a PDSCH, and may further include another downlink data channel used to transmit data.

(8) The terms "system" and "network" in the embodiments of the present invention are used interchangeably. The term "a plurality of" means "two or more". In view of this, "a plurality of" may also be understood as "at least two" in the embodiments of the present invention. The term "and/or" describes an association relationship between associated objects and indicates that three relationships may exist. For example, A and/or B may indicate the following three cases: Only A exists, both A and B exist, and only B exists. In addition, the character "/" generally indicates an "or" relationship between the associated objects unless otherwise specified. In some embodiments, the character "/" may be alternatively understood as "and/or", and a specific meaning may be understood based on a context.

To better understand the technical solutions in the embodiments of the present invention, an application scenario of the embodiments of the present invention is first described.

Figure 2:
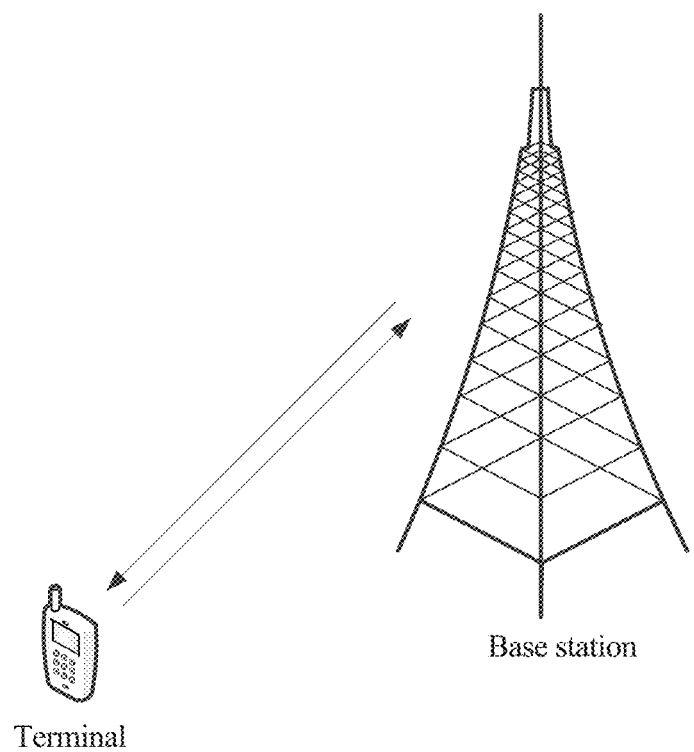
FIG. 2 is a schematic diagram of an application scenario according to an embodiment of the present invention.

FIG. 2 shows an application scenario according to an embodiment of the present invention. A terminal and a base station are included in FIG. 2. The terminal can exchange information with the base station. The base station can transmit downlink data to the terminal, and the terminal can also receive the downlink data transmitted by the base station. In addition, the terminal can further transmit uplink data to the base station, and the base station can also receive the uplink data transmitted by the terminal.

Figure 3:
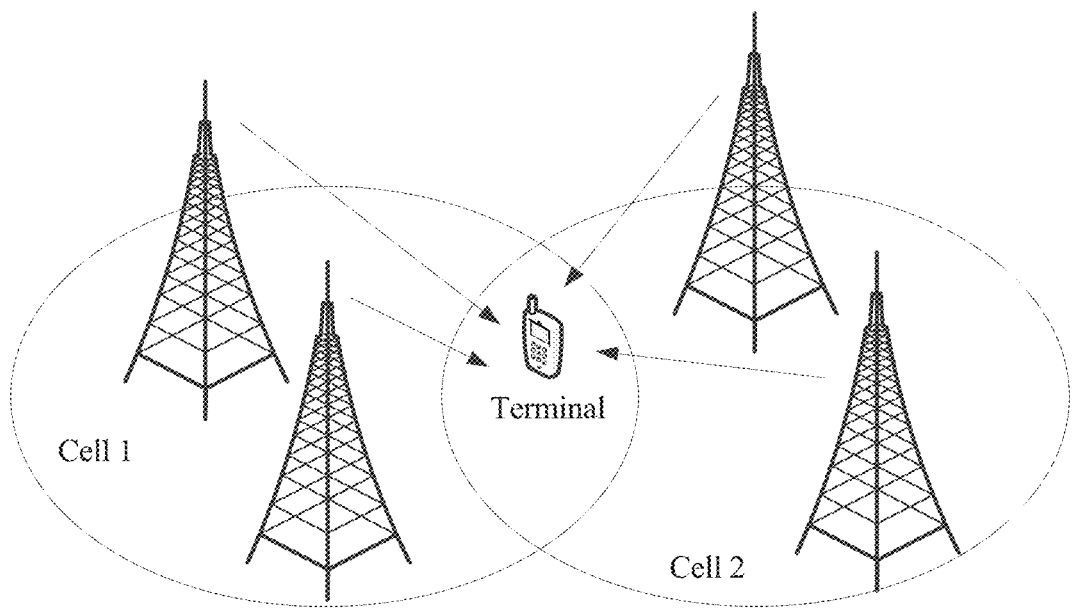
FIG. 3 is a schematic diagram of another application scenario according to an embodiment of the present invention.

In addition to the application scenario shown in FIG. 2, this embodiment of the present invention may also be used in a joint transmission scenario. For example, in a background of existing coordinated multipoint transmission/reception (Coordinated Multiple Points Transmission, CoMP), an existing multiple-input multiple-output (Multiple-Input Multiple-Output, MIMO) technology (including a diversity technology for improving transmission reliability and a multi-stream technology for increasing a data transmission rate) is combined with the coordinated multipoint transmission/reception to form a distributed multiple-antenna system, to better serve a user. FIG. 3 is a schematic diagram of an application scenario of performing coordinated transmission/reception by a plurality of antenna sites. An embodiment of the present invention is applicable to both a homogeneous network scenario and a heterogeneous network scenario, and does not limit a transmission point. This embodiment of the present invention may be applied to coordinated multipoint transmission/reception between macro base stations, between micro base stations, or between a macro base station and a micro base station, and is applicable to a frequency division duplex (FDD)/time division duplex (Time Division Duplexing, TDD)/flexible duplex (flexible duplexing, or Dynamic Time Division Duplexing, D-TDD) system. This embodiment of the present invention is applicable to both a low frequency (less than or equal to 6 GHz) scenario and a high frequency (greater than 6 GHz) scenario.

In an NR system, there is a plurality of possible time domain resource locations for a downlink data channel. In this case, a terminal cannot determine, according to a method applied to LTE, a time domain resource location occupied by the downlink data channel, and consequently cannot receive data at a correct location. To resolve this technical problem, the technical solutions in the embodiments of the present invention are provided. The following describes the technical solutions with reference to the accompanying drawings. An example in which the technical solutions provided in the embodiments of the present invention are applied to the application scenario shown in FIG. 2 or FIG. 3 is used in the following description process. If the technical solutions provided in the embodiments of the present invention are applied to the application scenario shown in FIG. 3, it may be considered that the embodiments of the present invention are described from a perspective of any one of base stations.

Figure 4:
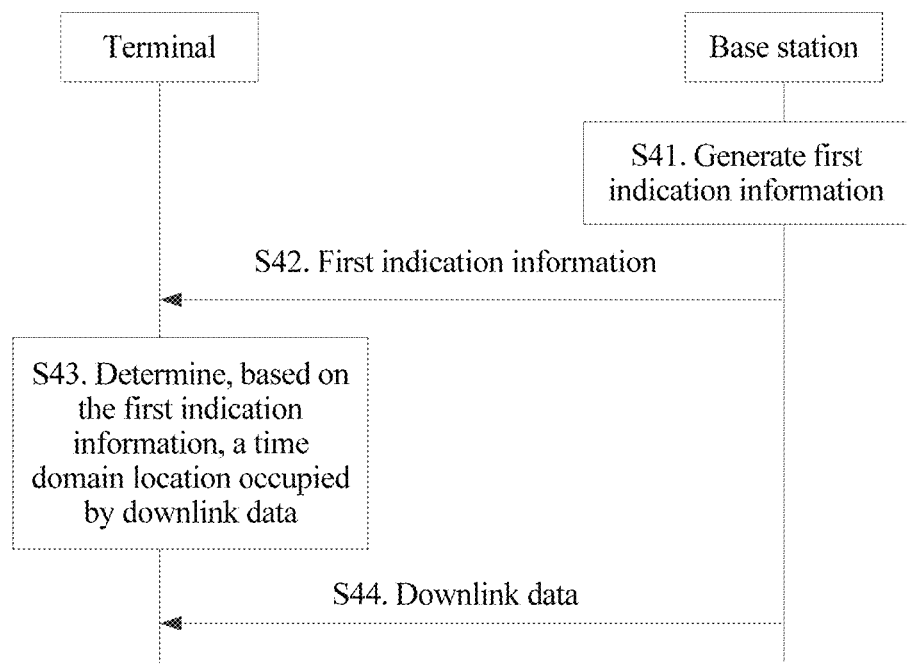
FIG. 4 is a flowchart of a resource indication method according to an embodiment of the present invention.

Referring to FIG. 4, an embodiment of the present invention provides a resource indication method. A procedure for the method is described as follows.

S41. A base station generates first indication information.

Before transmitting downlink data to a terminal, the base station generates the first indication information. The first indication information is used to indicate a resource configuration for transmitting the downlink data. The resource configuration may include a time domain resource configuration, for example, include a time scheduling unit aggregation level. For example, the resource configuration may include a time domain location in a single time scheduling unit. For another example, the resource configuration may include a time domain location in all time scheduling units. For still another example, the resource configuration may include a time domain location in each time scheduling unit.

If the resource configuration includes the time domain location in the single time scheduling unit, it is equivalent that the resource configuration includes only one time domain location. Herein, "one" is described relative to "a plurality of". For example, the time domain location used to indicate the single time scheduling unit may be understood as one time domain location. Then, if time domain locations in all time scheduling units are separately indicated, it is equivalent that the resource configuration needs to include a plurality of time domain locations. Signaling overheads required by one time domain location are apparently lower than signaling overheads required by a plurality of time domain locations. In this case, a time domain resource in the single time scheduling unit is valid for each time scheduling unit of one or more time scheduling unit a quantity of which is represented by the aggregation level. In other words, although the resource configuration includes only the time domain location in the single time scheduling unit, the time domain location in the single time scheduling unit may be applied to each time scheduling unit. Therefore, a time domain location in each time scheduling unit included in one or more time scheduling unit a quantity of which is represented by the aggregation level can be indicated by indicating the time domain location in the single time scheduling unit. This effectively reduces signaling overheads.

If the resource configuration includes the time domain location in all the time scheduling units, it is also equivalent that the resource configuration includes only one time domain location. In this embodiment of the present invention, the time domain locations in all the time scheduling units can be indicated by using only one time domain location. This apparently can effectively reduce signaling overheads compared with a case in which the time domain locations in all the time scheduling units are separately indicated.

If the resource configuration includes the time domain location in each time scheduling unit, it is equivalent that the resource configuration includes a plurality of time domain locations. In other words, the first indication information separately indicates time domain locations in all time scheduling units a quantity of which is represented by the aggregation level. This indication manner is relatively accurate, so that a workload of the terminal can be reduced, and the time domain location in each time scheduling unit can be directly determined.

As described above, the resource configuration may include different time domain locations. In other words, a time domain location may be indicated in the resource configuration by using different manners. During actual application, a default indication manner may be used in a system. For example, a protocol may specify that the resource configuration includes the time domain location in the single time scheduling unit by default in the system. In this case, the base station does not need to additionally notify, by using signaling, the terminal of a specific time domain location included in the resource configuration, and the terminal can know, according to the default rule, the specific time domain location included in the resource configuration. Alternatively, the base station may notify, by using signaling, the terminal of a specific time domain location included in the resource configuration indicated by the first indication information. For example, the base station sends fourth indication information to the terminal, and after receiving the fourth indication information, the terminal can determine a specific time domain configuration included in the resource configuration. For example, the base station sends the fourth indication information to the terminal, where the fourth indication information is used to indicate that the resource configuration indicated by the first indication information includes the time domain location in all the time scheduling units. This is equivalent to an application manner in which the base station notifies, by using signaling, the terminal of a time domain location included in the resource configuration. In this case, the fourth indication information and the first indication information may be same indication information, or the fourth indication information and the first indication information may be two fields in one piece of signaling, or the fourth indication information may be sent by using other signaling, for example, sent by using higher layer signaling or physical layer signaling. This is not limited in this embodiment of the present invention.

For example, the first indication information includes a first field, and the first field may be used to indicate the time domain location in the single time scheduling unit, used to indicate the time domain location in all the time scheduling units, or used to indicate the time domain location in each time scheduling unit. It should be noted that if the technical solutions provided in this embodiment of the present invention are applied to the application scenario shown in FIG. 3, when base stations transmit data to the terminal through joint transmission, some base stations may transmit downlink data to the terminal by using a plurality of time scheduling units, that is, transmit the downlink data to the terminal by using an aggregated time scheduling unit. The technical solutions provided in this embodiment of the present invention are applicable to any base station that transmits downlink data to the terminal by using a plurality of time scheduling units. The plurality of time scheduling units participating in aggregation that are scheduled by the base station may be continuous or discontinuous in time domain.

In this embodiment of the present invention, that the first indication information is used to indicate the time domain resource configuration for transmitting the downlink data includes but is not limited to the following several indication manners. For example, a specific used indication manner may be predefined or specified in a protocol in advance, and both the base station and the terminal can know the specific indication manner. Alternatively, the base station may notify the terminal of a specific indication manner by using signaling. Specifically, the signaling and the first indication information may be two fields in one piece of signaling, or the signaling may be sent by using other signaling, for example, sent by using higher layer signaling or physical layer signaling. This is not limited in this embodiment of the present invention.

Manner 1: The time domain location indicated by the first indication information includes a starting location of the time domain location and a time domain ending location that are occupied by the downlink data.

It may be understood that if the first indication information is used to indicate the time domain location in the single time scheduling unit or is used to indicate the time domain location in all the time scheduling units a quantity of which is represented by the aggregation level, the first indication information includes one starting location of the time domain location and one time domain ending location. For example, if the first indication information indicates the time domain location in the single time scheduling unit or the time domain location in all the time scheduling units by using a first field, the first field includes one starting location of the time domain location and one time domain ending location. Alternatively, if the first indication information is used to indicate the time domain location in each time scheduling unit included in one or more time scheduling unit a quantity of which is represented by the aggregation level, the first indication information includes a plurality of time domain starting locations and a plurality of time domain ending locations. For example, if the first indication information indicates the time domain location in each time scheduling unit by using a first field, the first field includes a plurality of time domain starting locations and a plurality of time domain ending locations, and a quantity of time domain starting locations included in the first field is the same as that of time domain ending locations included in the first field, and both the quantities are equal to a value of the aggregation level.

As described above, the first indication information may be further used to indicate the aggregation level. In this embodiment of the present invention, the base station may indicate the starting location of the time domain location and the time domain ending location that are occupied by the downlink data and the time scheduling unit aggregation level through joint coding. The following uses an example for description. An example in which the time scheduling unit is a slot is used in the following description process. For example, states of the time domain starting location, the time domain ending location, and slot aggregation are predefined, and a specific used state is indicated by the first indication information. For example, the defined states are listed in Table 1: At least one of the states is included. Table 1 lists a mapping relationship between a value of the first indication information and the starting location of the time domain location and the time domain ending location that are occupied by the downlink data and the time scheduling unit aggregation level. Each bit value corresponds to one state.

TABLE 1

| Bit (bit) value | starting (starting) | ending (ending) | Slot aggregation level (level) |
|---|---|---|---|
| 0000 | 0 | 0 | 1 |
| 0001 | 0 | 0 | 2 |
| 0010 | 0 | 0 | 4 |
| 0011 | 0 | 0 | 8 |
| 0100 | 1 | −1 | 1 |
| 0101 | 1 | −1 | 2 |
| 0110 | 1 | −1 | 4 |
| 0111 | 1 | −1 | 8 |
| 1000 | 2 | −1 | 1 |
| 1001 | 2 | −1 | 2 |
| 1010 | 2 | −1 | 4 |
| 1011 | 2 | −1 | 8 |
| 1100 | 2 | −2 | 1 |
| 1101 | 2 | −2 | 2 |
| 1110 | 2 | −2 | 4 |
| 1111 | 2 | −2 | 8 |

In Table 1, "bit value" indicates a bit value of the first indication information, "starting" indicates a starting location of the time domain location indicated by the first indication information, and "ending" indicates a time domain ending location indicated by the first indication information. For example, if the bit value of the first indication information is 1010, it indicates that the starting location of the time domain location is 2, the time domain ending location is −1, and the slot aggregation level is 4, that is, four slots participate in aggregation.

It should be noted that the specific values in Table 1 are examples. In Table 1, values of "starting" are 0, 1, and 2. During application, in another example, the values of "starting" may be alternatively 0, −1, −2, and the like. In Table 1, values of "ending" are 0, −1, and −2. During application, in another example, the values of "ending" may be alternatively 0, 1, 2, and the like. In Table 1, values of "slot aggregation level" are 1, 2, 4, and 8. During application, in another example, the values of "slot aggregation level" may be alternatively 1, 2, 3, 4, and the like.

Meanings indicated by the value of "starting" and the value of "ending" are described later.

Alternatively, for example, states of the time domain starting location, the time domain ending location, and slot aggregation are predefined, and a specific used state is indicated by the first indication information. For example, the defined states are listed in Table 2: At least one of the states is included. Table 2 lists another mapping relationship between a value of the first indication information and the starting location of the time domain location and the time domain ending location that are occupied by the downlink data and the time scheduling unit aggregation level. Each bit value corresponds to one state.

TABLE 2

| Bit value | starting | ending | Slot aggregation level |
|---|---|---|---|
| 0000 | 0 | 0 | 1 |
| 0001 | 0 | 0 | 2 |
| 0010 | 0 | 0 | 4 |
| 0011 | 0 | 0 | 8 |
| 0100 | 1 | 1 | 1 |
| 0101 | 1 | 1 | 2 |
| 0110 | 1 | 1 | 4 |
| 0111 | 1 | 1 | 8 |
| 1000 | 2 | 1 | 1 |
| 1001 | 2 | 1 | 2 |
| 1010 | 2 | 1 | 4 |
| 1011 | 2 | 1 | 8 |

TABLE 2-continued

| Bit value | starting | ending | Slot aggregation level |
|---|---|---|---|
| 1100 | 2 | 2 | 1 |
| 1101 | 2 | 2 | 2 |
| 1110 | 2 | 2 | 4 |
| 1111 | 2 | 2 | 8 |

In Table 2, "bit value" indicates a bit value of the first indication information, "starting" indicates a starting location of the time domain location indicated by a first field, and "ending" indicates a time domain ending location indicated by the first indication information. For example, if the bit value of the first indication information is 1010, it indicates that the starting location of the time domain location is 2, the time domain ending location is 1, and the slot aggregation level is 4, that is, four slots participate in aggregation.

Alternatively, for example, states of the time domain starting location, the time domain ending location, and slot aggregation are predefined, and a specific used state is indicated by the first indication information. For example, the defined states are listed in Table 3: At least one of the states is included. Table 3 lists another mapping relationship between a value of the first indication information and the starting location of the time domain location and the time domain ending location that are occupied by the downlink data and the time scheduling unit aggregation level. Each bit value corresponds to one state.

TABLE 3

| Bit value | (starting, ending, slot aggregation level) |
|---|---|
| 0000 | (0, 0, 1) |
| 0001 | (0, 0, 2) |
| 0010 | (0, 0, 4) |
| 0011 | (0, 0, 8) |
| 0100 | (1, 0, 1) |
| 0101 | (1, 0, 2) |
| 0110 | (1, 0, 4) |
| 0111 | (1, 0, 8) |
| 1000 | (1, 1, 1) |
| 1001 | (1, 1, 2) |
| 1010 | (1, 1, 4) |
| 1011 | (1, 1, 8) |
| 1100 | (2, 1, 1) |
| 1101 | (2, 1, 2) |
| 1110 | (2, 1, 4) |
| 1111 | (2, 1, 8) |

In Table 3, "bit value" indicates a bit value of the first indication information, "starting" indicates a starting location of the time domain location indicated by the first indication information, and "ending" indicates a time domain ending location indicated by the first indication information. For example, if a bit value of a first field is 1010, it indicates that the starting location of the time domain location is 1, the time domain ending location is 1, and the slot aggregation level is 4, that is, four slots participate in aggregation.

The foregoing Table 1 to Table 3 are merely examples, and a specific joint coding manner is not limited in this embodiment of the present invention.

If the joint coding manner is used, the base station may prestore the mapping relationship between the bit value of the first indication information and the starting location of the time domain location and the time domain ending location that are occupied by the downlink data and the time scheduling unit aggregation level. For example, the base station may obtain the mapping relationship according to a specification in a protocol or a standard, or the base station may preconfigure the mapping relationship. In this case, after determining the starting location of the time domain location and the time domain ending location that are occupied by the downlink data and the time scheduling unit aggregation level, the base station knows, based on the mapping relationship, how to perform joint coding. Alternatively, the terminal may obtain the mapping relationship by using the protocol or the standard, or the base station sends the mapping relationship to the terminal by using signaling. In this case, after receiving the first indication information, the terminal determines the bit value of the first indication information through parsing, and therefore can learn the starting location of the time domain location and the time domain ending location that are occupied by the downlink data and the time scheduling unit aggregation level based on the mapping relationship. Alternatively, the base station may separately indicate the time domain location and the aggregation level. The aggregation level may be indicated by indicating a quantity of time scheduling units, or may be indicated in a bitmap (bitmap) indication manner. This is not specifically limited herein.

The following describes the meanings indicated by the value of "starting" and the value of "ending".

In an example, a value of "starting" indicates a location from which the downlink data starts. For example, the value of "starting" is 0, indicating that the downlink data starts to be transmitted from a location of a symbol 0; in other words, data transmission starts from the first symbol in a time scheduling unit. Alternatively, the value of "starting" is 1, indicating that the downlink data starts to be transmitted from a location of a symbol 1; in other words, data transmission starts from the second symbol in a time scheduling unit. The rest can be deduced from this.

Alternatively, in an example, a value of "starting" may indicate a quantity of symbols occupied by a control channel, or indicate a quantity of symbols occupied by a channel other than a downlink data channel used for transmitting the downlink data. For example, the value of "starting" is 0, indicating that the control channel occupies zero symbols, and therefore the downlink data starts to be transmitted and/or mapped from the first symbol in a time scheduling unit. Alternatively, the value of "starting" is 1, indicating that the control channel occupies one symbol, and therefore the downlink data starts to be transmitted and/or mapped from the second symbol in a time scheduling unit. The rest can be deduced from this.

Alternatively, in an example, a value of "starting" may indicate a location of a symbol, after a control channel, from which the downlink data starts to be transmitted. For example, the value of "starting" is 0, indicating that a location of a symbol after the zeroth symbol after the control channel is the location of the symbol from which the downlink data starts to be transmitted, and therefore the downlink data starts to be transmitted and/or mapped from the first symbol after the control channel. Alternatively, the value of "starting" is 1, indicating that a location of a symbol after the first symbol after the control channel is the location of the symbol from which the downlink data starts to be transmitted, and therefore the downlink data starts to be transmitted and/or mapped from the second symbol after the control channel. The rest can be deduced from this.

Regardless of whether the value of "starting" indicates the quantity of symbols occupied by the control channel or the location of the symbol, after the control channel, from which the downlink data starts to be transmitted, a location from which the downlink data starts to be transmitted can be actually determined based on the value of "starting". Therefore, it may be considered that the value of "starting" is used to indicate the starting location of the time domain location occupied by the downlink data.

A location of the control channel may be indicated by using higher layer signaling.

In an example, a value of "ending" may indicate a location at which the downlink data ends, namely, the time domain ending location occupied by the downlink data. For example, the value of "ending" is 0, indicating that the location at which the downlink data ends is the last symbol; in other words, a symbol occupied by the downlink data in a time scheduling unit includes the last symbol in the time scheduling unit. Alternatively, the value of "ending" is −1, indicating that the last symbol is not used for transmitting the downlink data; in other words, a symbol occupied by the downlink data in a time scheduling unit does not include the last symbol in the time scheduling unit. Alternatively, the value of "ending" is −2, indicating that the penultimate symbol and the last symbol are not used for transmitting the downlink data; in other words, a symbol occupied by the downlink data in a time scheduling unit includes neither the last symbol nor the penultimate symbol in the time scheduling unit. The rest can be deduced from this.

A specific value range of "starting" may be the same as or different from that of "ending". For example, the value range of "stating" is 0, 1, 2, and 3, and the value range of "ending" is 0, 1, and 2; the value range of "starting" is 1 and 2, and the value range of "ending" is 0, 1, and 2; or the value range of "starting" is 0, 1, and 2, and the value range of "ending" is 1 and 2.

The value range of "starting" and the value range of "ending" may be predefined in a protocol, or may be notified by using signaling, for example, notified by using higher layer signaling or physical layer information. The higher layer signaling is, for example, RRC signaling or media access control (Media Access Control, MAC) signaling. In a same case, both the value range of "starting" and the value range of "ending" may be indicated by using one piece of signaling, or the value range of "starting" and the value range of "ending" may be separately indicated by using different signaling.

Specifically, a value range of the slot aggregation level may be predefined in a protocol, or may be notified by using signaling, for example, notified by using higher layer signaling or physical layer information.

As described above, the resource configuration may include different time domain locations. The following describes different indication manners of the resource configuration.

If the first indication information is used to indicate the time domain location of the downlink data in the single time scheduling unit, the one starting location of the time domain location included in the first indication information is used to indicate a starting location of the downlink data in one time scheduling unit, and the one time domain ending location included in the first indication information is used to indicate an ending location of the downlink data in the time scheduling unit. Regardless of the quantity of time scheduling units a quantity of which is represented by the aggregation level scheduled by the base station, a starting location of the downlink data in each scheduled time scheduling unit is indicated by using the one starting location of the time domain location included in the first indication information, and an ending location of the downlink data in each scheduled time scheduling unit is indicated by the one time domain ending location included in the first indication information.

Figure 5:
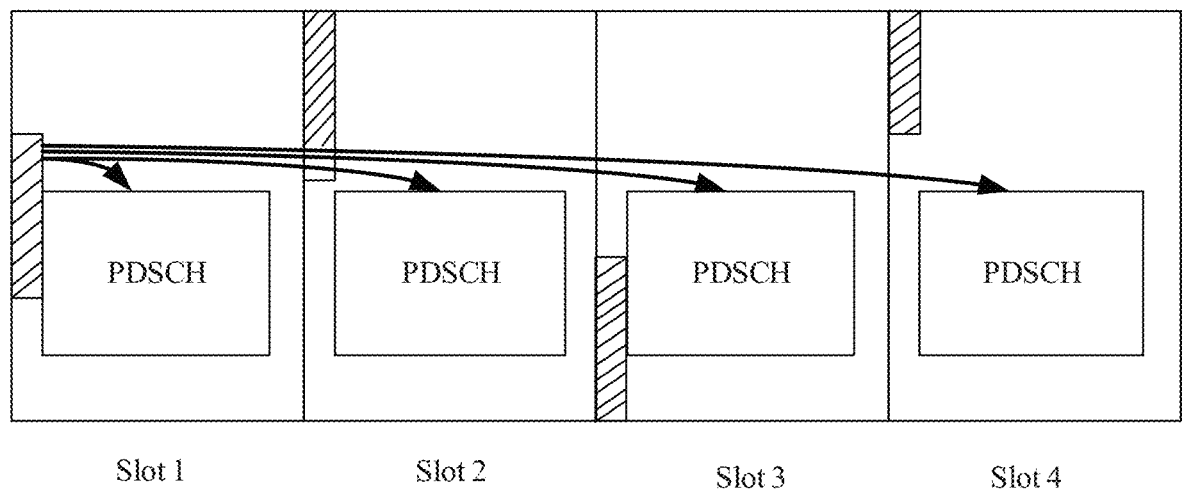
FIG. 5 is a schematic diagram of an indication manner of first indication information according to an embodiment of the present invention.

For example, the time scheduling unit is a slot, the aggregation level is 4, the values of "starting" and "ending" are set to (1, −1), the value of "starting" means that the downlink data starts from the second symbol, and the value of "ending" means that the downlink data ends at the penultimate symbol. In this case, it indicates that in each of the four slots, the downlink data starts from the second symbol and ends at the penultimate symbol. Reference may be made to FIG. 5. In FIG. 5, a PDSCH is used to transmit downlink data, parts drawn with oblique lines indicate a PDCCH that is a control channel, and arrows indicate locations from which the downlink data starts. In other words, the PDSCH occupies a same time domain location in four slots.

It can be learned that if the downlink data occupies a same time domain location in all the time scheduling units, this indication manner is relatively applicable. In this indication manner, time domain occupation statuses in all the time scheduling units can be separately indicated, and signaling overheads can be effectively reduced. Alternatively, to reduce signaling overheads, if the downlink data occupies different time domain locations in the time scheduling units participating in aggregation, the base station may choose to indicate an intersection set of the time domain locations occupied by the downlink data in all the time scheduling units. For example, the time scheduling unit is a slot, the aggregation level is 4, and a time domain location occupied by the downlink data in the first slot starts from the second symbol and ends at the penultimate symbol; a time domain location occupied by the downlink data in the second slot starts from the third symbol and ends at the penultimate symbol; a time domain location occupied by the downlink data in the third slot starts from the third symbol and ends at the penultimate symbol; and a time domain location occupied by the downlink data in the fourth slot starts from the second symbol and ends at the penultimate symbol. In this case, to use one time domain location for indication, the base station may determine to use the value of "starting" to indicate that the downlink data starts from the third symbol, and use the value of "ending" to indicate that the downlink data ends at the penultimate symbol. By discarding some symbols, overheads of signaling for indication can be reduced.

Alternatively, if the first indication information is used to indicate the time domain location in all the time scheduling units a quantity of which is represented by the aggregation level, the one starting location of the time domain location included in the first indication information is used to indicate a starting location of the downlink data in a time scheduling unit that is included in one or more time scheduling unit a quantity of which is represented by the aggregation level and that ranks first in terms of time, and the one time domain ending location included in the first indication information is used to indicate an ending location of the downlink data in the last time scheduling unit included in one or more time scheduling unit a quantity of which is represented by the aggregation level.

It can be learned that, in this indication manner, even if the downlink data occupies different time domain locations in different time scheduling units, a scheduling status in the different time scheduling units can be indicated. This manner is relatively flexible.

Regardless of whether the resource configuration includes the time domain location in all the time scheduling units a quantity of which is represented by the aggregation level or includes the time domain location in the single time scheduling unit, in this manner, a scheduling status in all the time scheduling units can be indicated by using one time domain location, without separately indicating scheduling statuses in all the time scheduling units. This can effectively reduce signaling overheads.

Certainly, the first indication information may be alternatively used to indicate the time domain location in each time scheduling unit. In this case, the plurality of time domain starting locations included in the first indication information are used to respectively indicate starting locations of the downlink data in all the time scheduling units a quantity of which is represented by the aggregation level, and the plurality of time domain ending locations included in the first indication information are used to respectively indicate ending locations of the downlink data in all the time scheduling units a quantity of which is represented by the aggregation level. If time domain locations in different time scheduling units are different, the time domain locations in the different time scheduling units are more flexibly indicated in this indication manner.

Manner 2: The time domain location indicated by the first indication information includes a starting location of the time domain location occupied by the downlink data and a quantity of indication units occupied by the downlink data. The indication unit is a time domain granularity used in the first indication information, the quantity of occupied indication units may be understood as duration of the downlink data, and knowing the starting location of the time domain location and the duration is equivalent to knowing the starting location of the time domain location and a time domain ending location.

It may be understood that if the first indication information is used to indicate the time domain location in the single time scheduling unit or is used to indicate the time domain location in all the time scheduling units a quantity of which is represented by the aggregation level, the first indication information includes one starting location of the time domain location and one quantity. For example, if the first indication information indicates the time domain location in the single time scheduling unit or the time domain location in all the time scheduling units by using a first field, the first indication information includes one starting location of the time domain location and one quantity. Alternatively, if the first indication information is used to indicate the time domain location in each time scheduling unit included in one or more time scheduling unit a quantity of which is represented by the aggregation level, the first indication information includes a plurality of time domain starting locations and a plurality of quantities. For example, if the first indication information indicates the time domain location in each time scheduling unit by using a first field, the first field includes a plurality of time domain starting locations and a plurality of quantities, and a quantity of time domain starting locations included in the first field is the same as that of indication units included in the first field, and both the quantities are equal to a value of the aggregation level.

If the first indication information is used to indicate the time domain location in the single time scheduling unit, the one starting location of the time domain location included in the first indication information is used to indicate a starting location of the downlink data in one time scheduling unit, and the one quantity included in the first indication information is used to indicate a quantity of indication units occupied by the downlink data in the time scheduling unit. Regardless of a quantity of time scheduling units a quantity of which is represented by the aggregation level scheduled by the base station, a starting location of the downlink data in each scheduled time scheduling unit is the starting location of the time domain location indicated by the first indication information, and a quantity of indication units occupied by the downlink data in each scheduled time scheduling unit is the duration indicated by the first indication information. For example, if the time scheduling unit is a slot, the indication unit is a symbol, and one slot includes seven symbols, it may be indicated that transmission starts from a number X symbol in a slot and N symbols are occupied in the slot. A value of X is 0, 1, 2, 3, 4, 5, or 6, and N is an integer less than or equal to 7 and greater than or equal to 0.

Alternatively, if the first indication information is used to indicate the time domain location in all the time scheduling units a quantity of which is represented by the aggregation level, the one starting location of the time domain location included in the first indication information is used to indicate a starting location of the downlink data in a time scheduling unit that is included in one or more time scheduling unit a quantity of which is represented by the aggregation level and that ranks first in terms of time, and the quantity of occupied indication units that is included in the first indication information is used to indicate a total quantity of indication units occupied by the downlink data in all the time scheduling units a quantity of which is represented by the aggregation level.

In addition, the first indication information may be further used to indicate the aggregation level. As described in Manner 1, the base station may indicate the starting location of the time domain location and the time domain ending location that are occupied by the downlink data and the time scheduling unit aggregation level through joint coding. Likewise, the base station may also indicate the starting location of the time domain location occupied by the downlink data, the quantity of indication units occupied by the downlink data, and the time scheduling unit aggregation level through joint coding. For a specific joint coding manner, a specific indication manner, and the like, refer to the descriptions in Manner 1. Details are not described herein.

Alternatively, the base station may separately indicate the time domain location and the aggregation level. The aggregation level may be indicated by indicating the quantity of time scheduling units, or may be indicated in a bitmap indication manner. This is not specifically limited herein.

The manner in which the quantity of occupied indication units is used for indication is more applicable to a case in which time scheduling units are continuous and time domain locations occupied by downlink data in the time scheduling unit are also continuous. In this way, an indication deviation caused by discontinuity can be avoided as much as possible.

Regardless of whether the resource configuration includes the time domain location in all the time scheduling units a quantity of which is represented by the aggregation level or includes the time domain location in the single time scheduling unit, in this manner, a scheduling status in all the time scheduling units can be indicated by using one time domain location, without separately indicating scheduling statuses in all the time scheduling units. This can effectively reduce signaling overheads.

Certainly, the first indication information may be alternatively used to indicate the time domain location in each time scheduling unit. In this case, the plurality of time domain starting locations included in the first indication information are used to respectively indicate starting locations of the downlink data in all the time scheduling units a quantity of which is represented by the aggregation level, and the plurality of quantities included in the first indication information are used to respectively indicate quantities of indication units occupied by the downlink data in all the time scheduling units a quantity of which is represented by the aggregation level. If time domain locations in different time scheduling units are different, the time domain locations in the different time scheduling units are more flexibly indicated in this indication manner.

Manner 3: The time domain location indicated by the first indication information includes a bitmap of a symbol included in the single time scheduling unit or includes a bitmap of an indication unit included in the single time scheduling unit; or includes a bitmap of a symbol included in each of a plurality of time scheduling units or includes a bitmap of an indication unit included in each of a plurality of time scheduling units. The bitmap of the symbol or the bitmap of the indication unit is used to indicate the time domain location occupied by the downlink data. The time domain location and the aggregation level may be indicated through joint coding. Alternatively, the time domain location and the aggregation level may be separately indicated. The aggregation level may be indicated by indicating a quantity of time scheduling units, or may be indicated in a bitmap (bitmap) indication manner. This is not specifically limited herein.

When Manner 3 is used, if the time domain location indicated by the first indication information includes the bitmap of the symbol included in the single time scheduling unit or includes the bitmap of the indication unit included in the single time scheduling unit, the time domain resource in the single time scheduling unit is valid for each time scheduling unit of one or more time scheduling unit a quantity of which is represented by the aggregation level. The time domain location and the aggregation level may be indicated through joint coding. Alternatively, the time domain location and the aggregation level may be separately indicated. The aggregation level may be indicated by indicating the quantity of time scheduling units, or may be indicated in the bitmap indication manner. This is not specifically limited herein.

For example, if the time scheduling unit is a slot, the indication unit is one symbol, and one slot includes seven symbols, the first indication information may indicate, by using 7 bits (bit), a time domain location occupied by the downlink data in one time scheduling unit. In other words, the time domain location occupied by the downlink data in one time scheduling unit may be indicated by using values of the 7 bits. For example, in the 7 bits, if a value of a bit is 0, it indicates that one symbol indicated by the bit can be used for transmitting the downlink data, and if a value of a bit is 1, it indicates that one symbol indicated by the bit cannot be used for transmitting the downlink data; or if a value of a bit is 0, it indicates that one symbol indicated by the bit cannot be used for transmitting the downlink data, and if a value of a bit is 1, it indicates that one symbol indicated by the bit can be used for transmitting the downlink data. A time domain location occupied by the downlink data in each slot participating in aggregation can be indicated by using the 7 bits, without separately indicating time domain locations in all slots, thereby effectively reducing signaling overheads. In addition, in this bitmap indication manner, a time domain location occupied by the downlink data in a time scheduling unit can be intuitionally indicated. This is relatively simple and clear.

Alternatively, for example, if the time scheduling unit is a subframe, one subframe includes 14 symbols, and the indication unit is two symbols, a first field may indicate, by using 7 bits (bit), the time domain location occupied by the downlink data in the single time scheduling unit. In other words, a time domain location occupied by the downlink data in one time scheduling unit may be indicated by using values of the 7 bits. For example, in the 7 bits, if a value of a bit is 0, it indicates that two symbols indicated by the bit can be used for transmitting the downlink data, and if a value of a bit is 1, it indicates that two symbols indicated by the bit cannot be used for transmitting the downlink data; or if a value of a bit is 0, it indicates that two symbols indicated by the bit cannot be used for transmitting the downlink data, and if a value of a bit is 1, it indicates that two symbols indicated by the bit can be used for transmitting the downlink data. It can be learned that if the time scheduling unit is a subframe, when a value map of the symbol is used for indication, 14 bits are required for indicating a time domain location occupied by the downlink data in one time scheduling unit. In this case, if a length of the indication unit is greater than that of the symbol, a value map of the indication unit is used for indication. Apparently, this can further reduce signaling overheads.

Alternatively, if the time domain location indicated by the first indication information includes bitmaps of symbols included in a plurality of time scheduling units or bitmaps of indication units included in a plurality of time scheduling units, the first indication information may include a plurality of bitmaps, and the bitmaps are in a one-to-one correspondence with the time scheduling units a quantity of which is represented by the aggregation level. This indication manner is relatively direct, so that the terminal can directly determine time domain locations in different time scheduling units. In addition, if time domain locations in different time scheduling units are different, the time domain locations in the different time scheduling units are more flexibly indicated in this indication manner.

The foregoing describes the concept of the indication unit, and the following further describes the indication unit.

Optionally, a length of the indication unit that is used when the first indication information is used to indicate the time domain location may be a length of a plurality of smallest time domain units for transmitting the downlink data. In other words, the indication unit may be a plurality of symbols. In this case, the first indication information can indicate a relatively large time domain range by using relatively low overheads. This can effectively reduce signaling overheads.

For the base station, the indication unit may be determined based on a frame structure parameter numerology for data transmission. A quantity of symbols included in the indication unit may be determined based on the numerology. For example, a time domain granularity at a subcarrier spacing of 15 kHz is one symbol, a time domain granularity at a subcarrier spacing of 30 kHz is two symbols, and a time domain granularity at a subcarrier spacing of 60 kHz is four symbols. When indicating the time domain location to the terminal, the base station may indicate the time domain location by using a symbol meaning indicated by the indication unit, to reduce signaling overheads. For example, a symbol length at a subcarrier spacing of 15 kHz is used as a basic unit. For example, if the base station is not subject to full-duplex, communication directions, i.e., uplink/downlink are consistent in a same time corresponding to numerologies corresponding to different frequency bands. When the indication unit is being selected, a symbol length corresponding to a minimum subcarrier spacing is used as the indication unit. This can reduce signaling overheads. For example, a symbol length corresponding to a subcarrier spacing of 15 kHz is used as the indication unit, and for example, one indication unit is indicated. If a subcarrier spacing of 30 kHz is actually used, the terminal knows that two symbols are actually indicated, that is, two symbols can be indicated by using 1 bit. Therefore, signaling overheads can be reduced.

In addition to the base station, the terminal also needs to determine the indication unit. Only in this way can the terminal determine the time domain location based on the first indication information. The determining, by the terminal, the indication unit includes but is not limited to the following several manners:

The terminal determines the indication unit according to a system default configuration or a protocol specification. The system default configuration or the protocol specification may be in different forms. For example, a protocol may specify a frame structure parameter referenced by the indication unit, where the frame structure parameter may be understood as a specific subcarrier spacing. For example, if the protocol specifies that the frame structure parameter referenced by the indication unit is a subcarrier spacing of 15 kHz, the terminal can determine that the length of the indication unit is a symbol length corresponding to the subcarrier spacing of 15 kHz. Alternatively, a protocol may directly specify the quantity of symbols included in the indication unit. For example, if the protocol specifies that the indication unit includes two symbols, the terminal knows the length of the indication unit based on a frame structure parameter of the downlink data.

Alternatively, the base station notifies the terminal of the length of the indication unit by using signaling. For example, the base station sends second indication information to the terminal, where the second indication information is used to notify the terminal of the length of the indication unit. The base station may also have different notification forms. For example, the base station notifies the terminal of a frame structure parameter referenced by the indication unit. For example, if the second indication information is used to notify the terminal that the frame structure parameter referenced by the indication unit is a subcarrier spacing of 15 kHz, after receiving the second indication information, the terminal can determine that the length of the indication unit is a symbol length corresponding to the subcarrier spacing of 15 kHz. In this case, the terminal knows the length of the indication unit based on a frame structure parameter of the downlink data. For example, if the frame structure parameter of the downlink data is a subcarrier spacing of 15 kHz, the indication unit is one symbol; if the frame structure parameter of the downlink data is a subcarrier spacing of 30 kHz, the indication unit is two symbols. Alternatively, the base station may directly notify the terminal of the quantity of symbols included in the indication unit. For example, if the second indication information is used to notify the terminal that the indication unit includes two symbols, the terminal knows the length of the indication unit based on the second indication information. The first indication information and the second indication information may be same indication information, or may be different fields included in one piece of signaling, or may be information sent by using different signaling. This is not limited in this embodiment of the present invention.

For example, for a value of the first indication information, refer to any one of Table 1 to Table 3. If a value of two most significant bits of the first indication information is 01, it indicates that the downlink data starts to be transmitted from a symbol indicated by the second indication unit. In this case, if the indication unit is one symbol, it indicates that the downlink data starts to be transmitted from the second symbol. If the indication unit is two symbols, it indicates that the downlink data starts to be transmitted from the second indication unit; in other words, the downlink data starts to be transmitted from the third symbol. The rest can be deduced from this.

For example, the first indication information indicates, by using the starting location of the time domain location and the time domain ending location, the time domain location occupied by the downlink data in the single time scheduling unit. For example, if the starting location of the time domain location is 1, the starting location of the time domain location means that the downlink data starts to be transmitted from a symbol indicated by the second indication unit. In this case, if the indication unit is one symbol, it indicates that the downlink data starts to be transmitted from the second symbol. If the indication unit is two symbols, it indicates that the downlink data starts to be transmitted from the second indication unit; in other words, the downlink data starts to be transmitted from the third symbol. The rest can be deduced from this.

For example, the first indication information indicates, in a bitmap manner, the time domain location occupied by the downlink data in the single time scheduling unit. For example, if the time scheduling unit is a slot, and one slot includes seven symbols, the first indication information indicates, by using 7 bits, a time domain location occupied by the downlink data in one time scheduling unit. For example, if a value of the 7 bits included in the first indication information is 1100101, each bit indicates a quantity of symbols in one indication unit. When the indication unit is one symbol, 1 bit indicates one symbol. When the indication unit is two symbols, 1 bit indicates two symbols. The rest can be deduced from this.

For example, the resource configuration indicated by the first field includes the starting location of the time domain location occupied by the downlink data and the quantity of indication units occupied by the downlink data. For example, if the downlink data starts to be transmitted from the second indication unit, when the indication unit is one symbol, it indicates that the downlink data starts to be transmitted from the second symbol. When the indication unit is two symbols, it indicates that the downlink data starts to be transmitted from the second indication unit; in other words, the downlink data starts to be transmitted from the third symbol. The rest can be deduced from this.

In addition, for example, if the time scheduling unit is a slot, and a type of a subframe to which slots participating in aggregation belong is a self-contained (self-contained) type, the slot includes a guard period (guard band, GP). If the GP can also be used for transmitting the downlink data, a resource for the downlink data transmission can be increased, thereby improving resource utilization. The following describes how to determine whether a GP can be used for transmitting the downlink data.

For example, one symbol at a subcarrier spacing of 15 kHz is a GP, and the GP corresponds to a length of two symbols at a subcarrier spacing of 30 kHz. It is equivalent that the two symbols at the subcarrier spacing of 30 kHz correspond to the one symbol that is used as the GP at the subcarrier spacing of 15 kHz. In this case, the two symbols at 30 kHz are processed as follows.

First, a location of a symbol used as a GP needs to be determined.

In an example, a predefined manner may be used. For example, if it is determined that a next symbol after the last symbol that is occupied by the downlink data is a location of a GP, the terminal can determine the location of the GP according to the predefinition. Alternatively, in another example, the base station may notify the terminal of a location of a GP by using signaling. For example, the base station notifies the terminal of the location of the GP by using physical layer signaling or higher layer signaling.

Next, how a GP resource is allocated needs to be determined.

In an example, the base station may determine, in a predefined manner or in a manner specified in a protocol, how a GP resource is allocated.

For example, the protocol specifies that for another subcarrier spacing, a location corresponding to a location of a GP corresponding to a subcarrier spacing of 15 kHz is also a GP. For example, one symbol at the subcarrier spacing of 15 kHz is a GP, and the GP corresponds to two symbols at a subcarrier spacing of 30 kHz. In this case, the two symbols at 30 kHz are a GP.

Alternatively, for example, the protocol specifies that for another subcarrier spacing, in symbols corresponding to a location of a GP corresponding to a subcarrier spacing of 15 kHz, only the last symbol is a GP, and all symbols before the last symbol are used for transmitting the downlink data. For example, one symbol at the subcarrier spacing of 15 kHz is a GP, and the GP corresponds to two symbols at a subcarrier spacing of 30 kHz. In this case, in the two symbols at 30 kHz, the last symbol is used as a GP, and the one symbol before the last symbol is used for transmitting the downlink data.

Alternatively, for example, the protocol specifies that for other different subcarrier spacings, in symbols corresponding to a location of a GP corresponding to a subcarrier spacing of 15 kHz, different symbols may be used as GPs. For example, one symbol at the subcarrier spacing of 15 kHz is a GP, and the GP corresponds to two symbols at a subcarrier spacing of 30 kHz and corresponds to four symbols at a subcarrier spacing of 60 kHz. In the two symbols at 30 kHz, the last symbol is a GP, and the one symbol before the last symbol is used for transmitting the downlink data; in the four symbols at 60 kHz, the first two symbols are used for transmitting the downlink data, the third symbol is used as a GP, and the last symbol is used for uplink transmission; and so on.

The base station may indicate a specific GP resource allocation manner to the terminal by using signaling. For example, the base station sends, to the terminal, information for indicating the GP resource allocation manner, where the information for indicating the GP resource allocation manner is indicated by using 1 bit or 2 bits. In this case, after receiving the information for indicating the GP resource allocation manner, the terminal knows how the GP resource is allocated. Alternatively, the terminal may directly determine a GP resource allocation manner in a predefined manner or in a manner specified in a protocol. The information for indicating the GP resource allocation manner may be carried in the first indication information and sent together with the first indication information, or may be sent in a manner in which the information for indicating the GP resource allocation manner and the first indication information are used as different fields in one piece of signaling, or may be sent by using signaling different from signaling used to send the first indication information. This is not limited in this embodiment of the present invention.

The foregoing describes how the first indication information indicates the time domain location occupied by the downlink data. In an NR system, a downlink data channel occupies a symbol that dynamically changes in time domain, and may not occupy entire bandwidth in frequency domain but just occupy partial bandwidth. Therefore, to more accurately determine a location of the downlink data, a frequency domain location may be determined in addition to the time domain location. In view of this, in this embodiment of the present invention, the first indication information may indicate a frequency domain resource configuration in addition to the time domain resource configuration. In other words, the first indication information may indicate the frequency domain location occupied by the downlink data, in addition to the time domain location occupied by the downlink data. The following provides descriptions.

For example, if the first indication information indicates the time domain location by using a first field, the first indication information may further include a second field, and the second field may be used to indicate the frequency domain location occupied by the downlink data. In this embodiment of the present invention, the second field corresponds to the first field. For example, the first indication information may include a plurality of first fields and a plurality of second fields, and each first field corresponds to one second field. Forms of the first field and the second field are not limited in this embodiment of the present invention.

Figure 6:
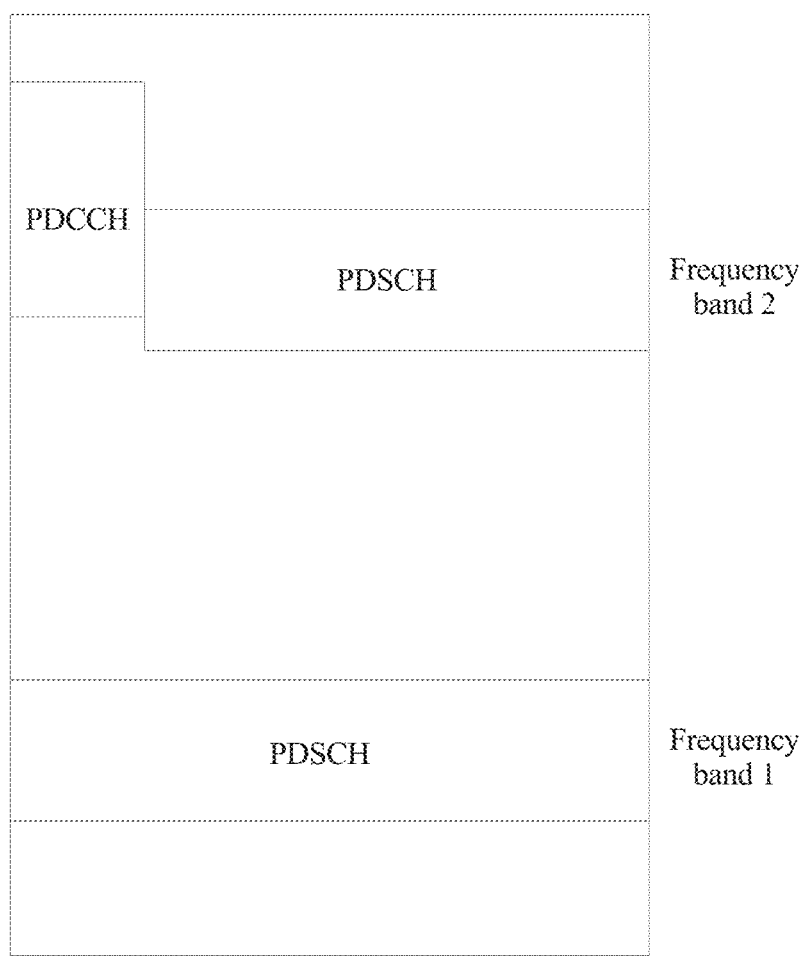
FIG. 6 is a schematic diagram of downlink data transmission in a slot according to an embodiment of the present invention.

In an example, the first field and the second field are separate fields. For example, there are M separate first fields and M separate second fields, and the M first fields are in a one-to-one correspondence with the M second fields, where M is a positive integer. For example, FIG. 6 is a schematic diagram of downlink data transmission in a slot. In this slot, downlink data occupies different locations in frequency domain, and also occupies different symbols in time domain. For example, a second field 1 is used to indicate that a frequency domain location of the downlink data is a frequency band 1, and a first field 1 corresponds to the second field 1 and is used to indicate that downlink data, namely, a PDSCH, transmitted in the frequency band 1 occupies the number zero symbol to the number six symbol in time domain. A second field 2 is used to indicate that a frequency domain location of the downlink data is a frequency band 2, and a first field 2 corresponds to the second field 2 and is used to indicate that downlink data, namely, a PDSCH, transmitted in the frequency band 2 occupies the number one symbol to the number seven symbol in time domain, and control information, namely, a PDCCH, is transmitted in the first symbol.

Figure 7:
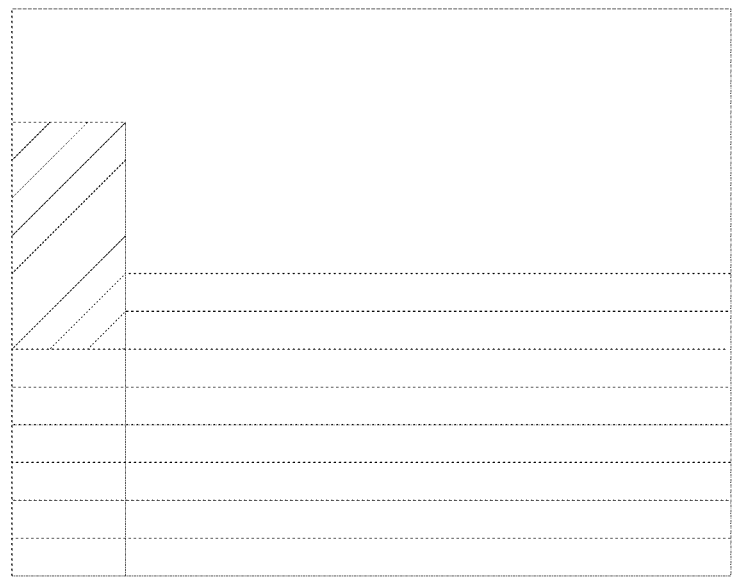
FIG. 7 is a schematic diagram of downlink data transmission in a slot according to an embodiment of the present invention.

In another example, the first field and the second field are jointly indicated. For example, in a manner, the second field includes the first field. For example, a second field 1 includes a first field 1, and a second field 2 includes a first field 2. In this case, the first field 1 corresponds to the second field 1, and the first field 2 corresponds to the second field 2. Alternatively, in another manner, the first field includes the second field. For example, a first field 1 includes a second field 1, and a first field 2 includes a second field 2. In this case, the first field 1 corresponds to the second field 1, and the first field 2 corresponds to the second field 2. Referring to FIG. 7, for example, considering that different time domain locations correspond to different frequency domain locations, a frequency domain location corresponding to a time domain location may be indicated when the time domain location is indicated; or considering that different frequency domain locations correspond to different time domain locations, a time domain location corresponding to a frequency domain location may be indicated when the frequency domain location is indicated. Through joint indication, a control channel and a data channel can be dynamically multiplexed, to avoid a waste of resources. In FIG. 7, a part drawn with oblique lines indicates a PDCCH, and a part drawn with horizontal lines indicates a PDSCH.

Whether the first field and the second field are separately indicated or jointly indicated may be specified in a protocol, or negotiated by the base station and the terminal in advance.

In this embodiment of the present invention, a frequency domain granularity indicated by the second field may be a frequency domain resource scheduling unit such as a bandwidth part (bandwidth part, BP), a mini-bandwidth part (mini-BP), a resource block group (Resource Block Group, RBG), or a resource block (Resource Block, RB).

Further, the base station may further indicate a mapping rule for the downlink data to the terminal. The mapping rule is used to indicate that during mapping, whether frequency domain mapping is performed on the downlink data before time domain mapping, or time domain mapping is performed on the downlink data before frequency domain mapping. Certainly, the base station may choose to directly indicate the mapping rule for the downlink data to the terminal. For example, the base station sends, to the terminal, third indication information used to indicate the mapping rule, and therefore the terminal knows the mapping rule after receiving the third indication information. For example, the third indication information is sent by using downlink control information (Downlink Control Information, DCI). For example, in the DCI, 1 bit is used as the third indication information. If a value of the 1 bit is 0, it indicates that during mapping, time domain mapping is performed on the downlink data before frequency domain mapping. If a value of the 1 bit is 1, it indicates that during mapping, frequency domain mapping is performed on the downlink data before time domain mapping. Certainly, vice versa.

The base station selects the mapping rule and notifies the terminal of the mapping rule, so that data can be better transmitted and received, thereby reducing implementation complexity of the base station and the terminal, and improving transmission performance.

Alternatively, the base station does not need to specially indicate the mapping rule to the terminal, and the terminal can determine the mapping rule based on characteristics of a time domain resource and a frequency domain resource that are allocated for the downlink data. If this manner is used, the terminal and the base station need to determine the mapping rule in the same manner.

Figure 8A:
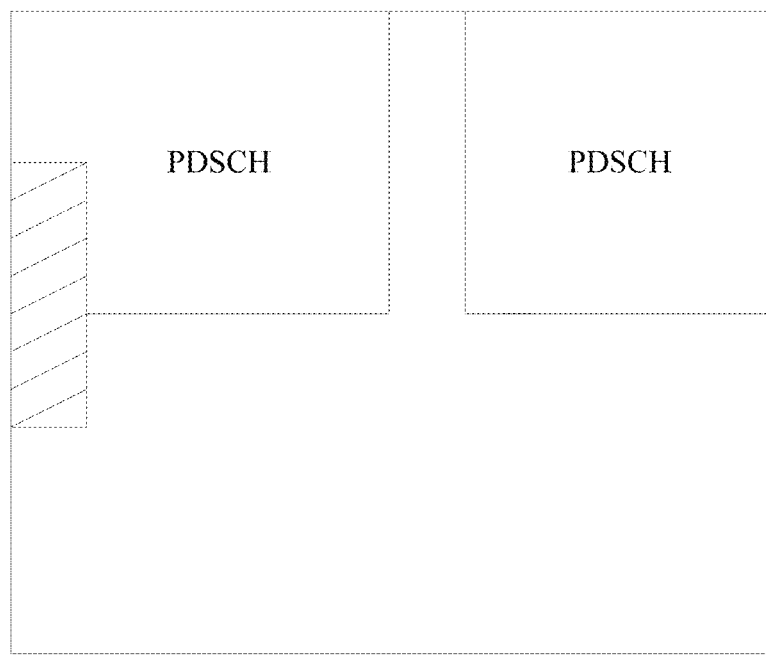
FIG. 8A to FIG. 8D are schematic diagrams of mapping downlink data by using different mapping rules according to an embodiment of the present invention.
Figure 8B:
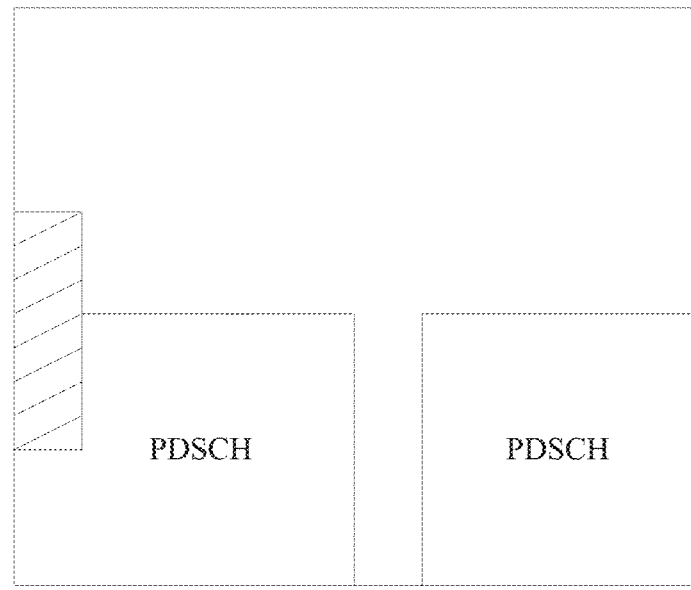

For example, if the downlink data occupies discontinuous locations in time domain, the base station may perform, during mapping, frequency domain mapping on the downlink data before time domain mapping, and the terminal also agrees on this mapping rule by default. Reference may be made to FIG. 8A and FIG. 8B. Parts with oblique lines in FIG. 8A and FIG. 8B each indicate a location occupied by a control channel. In both FIG. 8A and FIG. 8B, frequency domain mapping is performed on downlink data before time domain mapping.

Figure 8C:
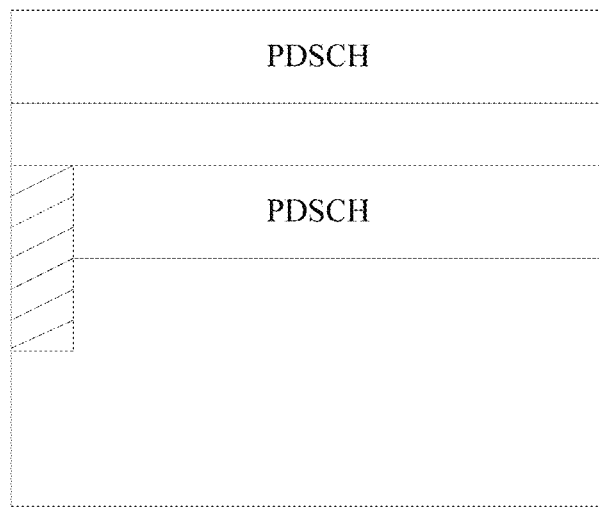
Figure 8D:
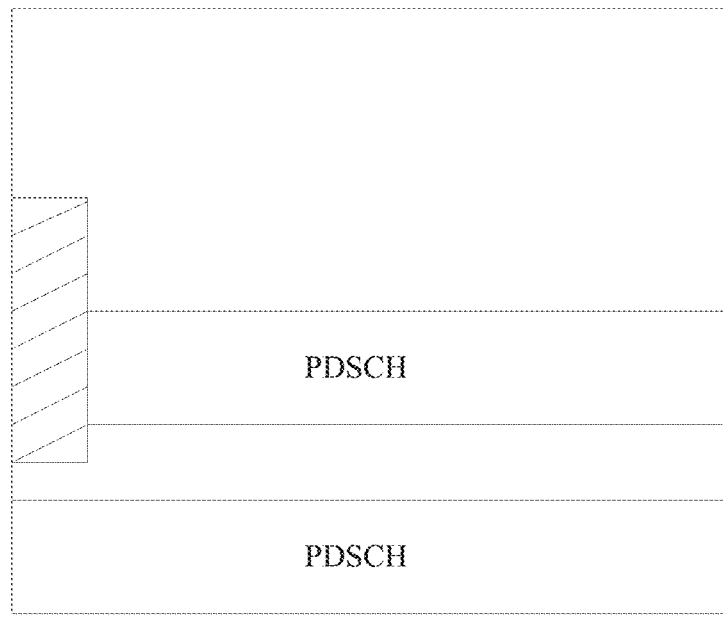

Alternatively, if the downlink data occupies discontinuous locations in frequency domain, the base station may perform, during mapping, time domain mapping on the downlink data before frequency domain mapping, and the terminal also agrees on this mapping rule by default. Reference may be made to FIG. 8C and FIG. 8D. Parts with oblique lines in FIG. 8C and FIG. 8D each indicate a location occupied by a control channel. In both FIG. 8C and FIG. 8D, time domain mapping is performed on downlink data before frequency domain mapping.

In this manner, discontinuous resource mapping locations can be reduced, to ensure resource mapping continuity as much as possible, and reduce implementation complexity of the base station and the terminal.

Alternatively, for data transmission cases in FIG. 8A and FIG. 8B, that is, when some symbols cannot be used by the base station to transmit data to the terminal, and the terminal does not know the symbols, the terminal may consider performing time domain mapping on the data before frequency domain mapping. In this way, data punctured from resources in the middle that cannot be used for transmitting the data is discontinuous, thereby avoiding a large quantity of continuous data reception errors of the terminal and improving data reception performance.

Alternatively, for data transmission cases in FIG. 8C and FIG. 8D, that is, when some frequency bands cannot be used by the base station to transmit data to the terminal, and the terminal does not know the frequency bands, the terminal may consider performing frequency domain mapping on the data before time domain mapping. In this way, data punctured from resources in the middle that cannot be used for transmitting the data is discontinuous, thereby avoiding a large quantity of continuous data reception errors of the terminal and improving data reception performance.

S42. The base station sends the first indication information to the terminal, and the terminal receives the first indication information.

The base station may send the first indication information to the terminal by using higher layer signaling or physical layer signaling. The higher layer signaling is, for example, radio resource control (Radio Resource Control, RRC) signaling, and the physical layer signaling is, for example, DCI.

S43. The terminal determines, based on the first indication information, a time domain location occupied by downlink data.

If the resource configuration indicated by the first indication information includes the time domain location in the single time scheduling unit, after receiving the first indication information, the terminal determines that the time domain resource in the single time scheduling unit is valid for each time scheduling unit of one or more time scheduling unit a quantity of which is represented by the aggregation level. It is equivalent that the terminal can determine the time domain location in each time scheduling unit based on the time domain location in the single time scheduling unit.

Alternatively, if the resource configuration indicated by the first indication information includes the time domain location in all the time scheduling units, after receiving the first indication information, the terminal may determine the time domain location in all the time scheduling units.

Alternatively, if the resource configuration indicated by the first indication information includes the time domain location in each time scheduling unit, after receiving the first indication information, the terminal may directly determine the time domain location in each time scheduling unit.

Specifically, if the first indication information indicates the starting location of the time domain location and the time domain ending location that are occupied by the downlink data and the time scheduling unit aggregation level through joint coding, the terminal may determine the starting location of the time domain location and the time domain ending location that are occupied by the downlink data and the time scheduling unit aggregation level based on the value of the first indication information, so that the terminal can determine the time domain location of the downlink data. Alternatively, the time domain location and the aggregation level may be separately indicated. The aggregation level may be indicated by indicating the quantity of time scheduling units, or may be indicated in the bitmap indication manner. This is not specifically limited herein.

Alternatively, if the first indication information indicates the starting location of the time domain location occupied by the downlink data, the quantity of indication units occupied by the downlink data, and the time scheduling unit aggregation level through joint coding, the terminal may determine the starting location of the time domain location occupied by the downlink data, the quantity of indication units occupied by the downlink data, and the time scheduling unit aggregation level based on a value of the first field, so that the terminal can determine the time domain location of the downlink data. Alternatively, the time domain location and the aggregation level may be separately indicated. The aggregation level may be indicated by indicating the quantity of time scheduling units, or may be indicated in the bitmap indication manner. This is not specifically limited herein.

Alternatively, if the first indication information includes the bitmap of the indication unit included in the single time scheduling unit, the terminal may determine that the bitmap included in the first indication information may be used in each time scheduling unit included in one or more time scheduling unit a quantity of which is represented by the aggregation level. In this way, the terminal knows the time domain location occupied by the downlink data in each time scheduling unit included in one or more time scheduling unit a quantity of which is represented by the aggregation level. The time domain location and the aggregation level may be indicated through joint coding. Alternatively, the time domain location and the aggregation level may be separately indicated. The aggregation level may be indicated by indicating the quantity of time scheduling units, or may be indicated in the bitmap indication manner. This is not specifically limited herein.

Alternatively, if the first indication information includes the value map of the symbol included in the single time scheduling unit, the terminal may determine that the bitmap included in the first indication information may be used in each time scheduling unit included in one or more time scheduling unit a quantity of which is represented by the aggregation level. In this way, the terminal knows the time domain location occupied by the downlink data in each time scheduling unit included in one or more time scheduling unit a quantity of which is represented by the aggregation level. The time domain location and the aggregation level may be indicated through joint coding. Alternatively, the time domain location and the aggregation level may be separately indicated. The aggregation level may be indicated by indicating the quantity of time scheduling units, or may be indicated in the bitmap indication manner. This is not specifically limited herein.

In an implementation, before S43, the base station may further send, to the terminal, information for indicating a time scheduling unit type. After receiving the information for indicating the time scheduling unit type, the terminal may determine, based on both the information for indicating the time scheduling unit type and the first indication information, the time domain location for transmitting the downlink data. Specifically, the terminal may determine, based on the information for indicating the time scheduling unit type, a time domain location that allows to be used for transmitting the downlink data in the time scheduling unit, and determine, based on the first indication information, a time domain location that is scheduled by the base station for transmitting the downlink data in the time scheduling unit. Then, the terminal uses an intersection set of the two time domain locations, and determines that a time domain location included in the intersection set as the time domain location for transmitting the downlink data.

For example, the time scheduling unit is a slot. A slot in a self-contained frame structure may include three types: a slot for downlink transmission only (downlink only), a slot for uplink transmission only (uplink only), and a self-contained slot (that is, both downlink transmission and uplink transmission are performed in the slot). Quantities of uplink and downlink symbols in the self-contained slot may be predefined, or may be notified by using higher layer signaling or physical layer signaling. For example, there are several states for the self-contained slot, and the base station may indicate a state of the self-contained slot to the terminal by using RRC signaling. These states have the following cases. For example, a state 1 is that there are five downlink symbols and two uplink symbols; a state 2 is that there are four downlink symbols and three uplink symbols; a state 3 is that there are four downlink symbols and two uplink symbols; a state 4 is that there are one downlink symbol and six uplink symbols; a state 5 is that there are two downlink symbols and six uplink symbols; a state 6 is that there are one uplink symbol and six downlink symbols; a state 7 is that there are two uplink symbols and five downlink symbols; and a state 8 is that there are two uplink symbols and four downlink symbols. In a slot, an order of a downlink symbol and an uplink symbol are not limited; and may be determined by the terminal through predefinition, or may be indicated by the base station to the terminal by using signaling.

Specifically, the terminal may use, as the determined time domain location for transmitting the downlink data, an intersection set of a symbol that allows to be used for transmitting the downlink data in the self-contained slot and a symbol indicated by the first indication information. For example, if the information for indicating the time scheduling unit type indicates that the first symbol to the fifth symbol in a slot are downlink transmission symbols, and the first indication information indicates that the second symbol to the sixth symbol in the slot are a time domain location for transmitting the downlink data, the terminal may determine that a time domain location of the downlink data in the slot is the second symbol to the fifth symbol.

The time scheduling unit type is indicated, so that the terminal can more accurately determine the time domain location for transmitting the downlink data, and is prevented from listening to the downlink data at a location at which the downlink data cannot be transmitted, thereby reducing power consumption of the terminal.

Alternatively, the terminal may determine the time domain location for data transmission based on the time scheduling unit type, without using the first indication information. This is not specifically limited herein.

The terminal may determine, based on an indication from the base station, the indication unit used in the first indication information. For example, the base station indicates the indication unit used in the first indication information to the terminal by using signaling such as higher layer signaling or physical layer signaling. The higher layer signaling is, for example, RRC signaling or MAC layer signaling, and the physical layer signaling is, for example, DCI signaling.

For example, if the base station notifies the terminal of a specific quantity of symbols occupied by the indication unit, the terminal can directly determine, based on the indication from the base station, the quantity of symbols occupied by the indication unit, for example, determine that the indication unit is two symbols or three symbols.

Alternatively, if the base station notifies the terminal of a specific frame structure parameter that is referenced, the terminal can directly determine, based on the indication from the base station, that a symbol length corresponding to the frame structure parameter that is referenced is the length of the indication unit. For example, if the base station indicates, to the terminal, that a subcarrier spacing of 15 KHz is referenced, the terminal determines that the indication unit is one symbol corresponding to the subcarrier spacing of 15 KHz.

If the time scheduling unit includes the GP, the terminal may alternatively determine the GP resource allocation manner. After determining the GP resource allocation manner, the terminal may further determine specific resources in the time scheduling unit that are used for transmitting the downlink data. If the base station sends, to the terminal, the information for indicating the GP resource allocation manner, after receiving the information for indicating the GP resource allocation manner, the terminal can determine how the GP resource is allocated. Alternatively, the base station may not send, to the terminal, the information for indicating the GP resource allocation manner, and the terminal may determine the GP resource allocation manner in a predefined manner or a manner specified in a protocol. In this case, the base station and the terminal need to determine the GP resource allocation manner on a same basis. Content included in the GP resource allocation manner has been described in S41, and details are not described again.

Moreover, as further described in S41, in addition to the first field, the first indication information may include the second field used to indicate the frequency domain location of the downlink data. In this case, if the first indication information further includes the second field, the terminal may determine the frequency domain location of the downlink data based on the second field. Therefore, the terminal can determine both the time domain location of the downlink data and the frequency domain location of the downlink data based on the first indication information, so that the terminal can listen to the downlink data at an accurate location.

If the first indication information includes a plurality of first fields and a plurality of second fields, there is a one-to-one correspondence between the first fields and the second fields. The base station may also indicate the correspondence between the first fields and the second fields to the terminal, and then the terminal can know how the first fields correspond to the second fields, so as to determine a corresponding time-frequency location of the downlink data.

Further, there is a specific mapping rule for mapping the downlink data by the base station. The mapping rule is used to indicate that during mapping, whether frequency domain mapping is performed on the downlink data before time domain mapping, or time domain mapping is performed on the downlink data before frequency domain mapping. Therefore, the terminal needs to know the mapping rule, so as to demodulate the downlink data.

In an example, the base station may choose to directly indicate the mapping rule for the downlink data to the terminal. For example, the base station sends, to the terminal, the third indication information used to indicate the mapping rule, and therefore the terminal knows the mapping rule after receiving the third indication information.

Alternatively, in another example, the base station does not need to specially indicate the mapping rule to the terminal, and the terminal can determine the mapping rule based on the characteristics of the time domain resource and the frequency domain resource that are allocated for the downlink data. If this manner is used, the terminal and the base station need to determine the mapping rule in the same manner. How the base station and the terminal determine the mapping rule has been described in S41, and details are not described again.

S44. The base station sends the downlink data to the terminal, and the terminal receives, at the determined time domain location, the downlink data sent by the base station.

After determining the time domain location of the downlink data in each time scheduling unit included in one or more time scheduling unit a quantity of which is represented by the aggregation level, the terminal can listen, at a correct location, to the downlink data sent by the base station.

Certainly, if the first indication information further includes the second field, the frequency domain location of the downlink data is determined. In this case, S44 may be: The base station sends the downlink data to the terminal, and the terminal receives, at the determined time domain location and frequency domain location, the downlink data sent by the base station.

It should be noted that downlink data transmission is used as an example for describing the embodiment shown in FIG. 4. However, during uplink data transmission, the base station also needs to indicate a resource to the terminal. The resource indication method provided in this embodiment of the present invention is also applicable to uplink data transmission, and details are not described herein.

In conclusion, according to the technical solutions provided in this embodiment of the present invention, the time-frequency location of the downlink data can be accurately indicated, and signaling overheads used to indicate the time-frequency location can be effectively reduced.

The following describes apparatuses provided in the embodiments of the present invention with reference to the accompanying drawings.

Figure 9:
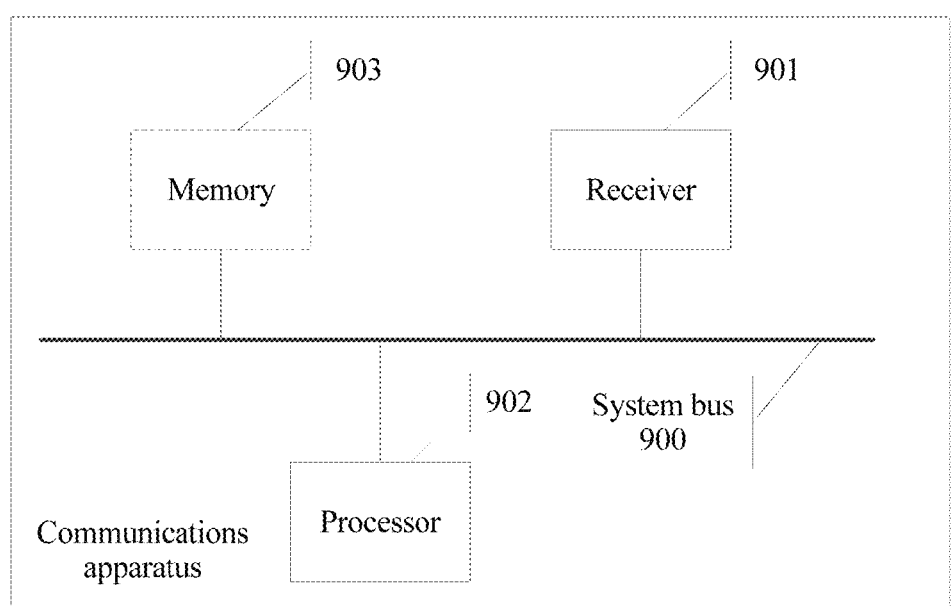
FIG. 9 to FIG. 11 are several schematic structural diagrams of communications apparatuses according to embodiments of the present invention.

Referring to FIG. 9, an embodiment of the present invention provides a communications apparatus. The communications apparatus includes a receiver 901 and a processor 902.

The processor 902 may include a central processing unit (central processor unit, CPU) or an application-specific integrated circuit (Application Specific Integrated Circuit, ASIC), or may include one or more integrated circuits configured to control program execution, or may include a hardware circuit developed by using a field programmable gate array (Field Programmable Gate Array, FPGA), or may include a baseband chip.

The receiver 901 is, for example, an antenna or a communications interface, and is configured to communicate with an external device.

In a possible implementation, the communications apparatus may further include a memory 903 that is also shown in FIG. 9. The memory 903 is not a mandatory component, and therefore is drawn in a form of a dashed-line box in FIG. 9, to be differentiated from the mandatory components. There may be one or more memories 903. The memory 903 may include a read-only memory (Read Only Memory, ROM), a random access memory (Random Access Memory, RAM), a magnetic disk memory, and the like. The memory 903 may be configured to store program code required by the processor 902 for executing a task, and may be further configured to store data.

The receiver 901 and the memory 903 may be connected to the processor 902 by using a system bus 900 (this is used as an example in FIG. 9), or may be connected to the processor 902 by using a dedicated connection cable.

The receiver 901 is configured to receive first indication information from a base station, where the first indication information is used to indicate a resource configuration for a downlink data transmission, the resource configuration includes a time scheduling unit aggregation level and a time domain location in a single time scheduling unit, and the aggregation level represents a quantity of time scheduling units included in a resource for the downlink data transmission. The processor 902 is configured to: determine that a time domain resource in the single time scheduling unit is valid for each time scheduling unit of one or more time scheduling unit a quantity of which is represented by the aggregation level, and receive the downlink data transmission accordingly by using the receiver 901.

Specifically, the receiver 901 may be configured to perform S42 and S44 in the embodiment shown in FIG. 4, and/or configured to support another process of the technology described in this specification. The processor 902 may be configured to perform S43 in the embodiment shown in FIG. 4, and/or configured to support another process of the technology described in this specification. All related content of the steps in the foregoing method embodiments may be cited in function descriptions of corresponding function modules. Details are not described herein.

The communications apparatus may be a separate network element, for example, the terminal in the embodiment shown in FIG. 4; or the communications apparatus may be a function module in a network element, for example, a function module in the terminal in the embodiment shown in FIG. 4.

Figure 10:
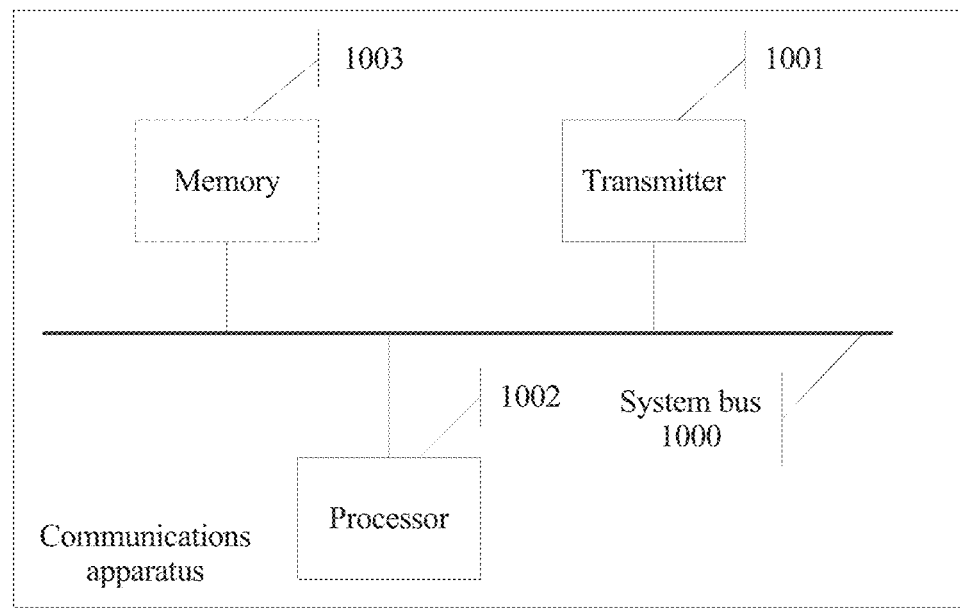

Referring to FIG. 10, an embodiment of the present invention provides a communications apparatus. The communications apparatus includes a transmitter 1001 and a processor 1002.

The processor 1002 may include a CPU or an ASIC, or may include one or more integrated circuits configured to control program execution, or may include a hardware circuit developed by using an FPGA, or may include a baseband chip.

The transmitter 1001 is, for example, an antenna or a communications interface, and is configured to communicate with an external device.

In a possible implementation, the communications apparatus may further include a memory 1003 that is also shown in FIG. 10. The memory 1003 is not a mandatory component, and therefore is drawn in a form of a dashed-line box in FIG. 10, to be differentiated from the mandatory components. There may be one or more memories 1003. The memory 1003 may include a ROM, a RAM, a magnetic disk memory, and the like. The memory 1003 may be configured to store program code required by the processor 1002 for executing a task, and may be further configured to store data.

The transmitter 1001 and the memory 1003 may be connected to the processor 1002 by using a system bus 1000 (this is used as an example in FIG. 10), or may be connected to the processor 1002 by using a dedicated connection cable.

The transmitter 1001 is configured to send first indication information to a terminal, where the first indication information is used to indicate a resource configuration for a downlink data transmission, the resource configuration includes a time scheduling unit aggregation level and a time domain location in a single time scheduling unit, and the aggregation level represents a quantity of time scheduling units included in a resource for the downlink data transmission. The processor 1002 is configured to: determine that a time domain resource in the single time scheduling unit is valid for each time scheduling unit of one or more time scheduling unit a quantity of which is represented by the aggregation level, and transmit the downlink data accordingly by using the transmitter 1001.

Specifically, the transmitter 1001 may be configured to perform S42 and S44 in the embodiment shown in FIG. 4, and/or configured to support another process of the technology described in this specification. The processor 1002 may be configured to perform S41 in the embodiment shown in FIG. 4, and/or configured to support another process of the technology described in this specification. All related content of the steps in the foregoing method embodiments may be cited in function descriptions of corresponding function modules. Details are not described herein.

The communications apparatus may be a separate network element, for example, the base station in the embodiment shown in FIG. 4; or the communications apparatus may be a function module in a network element, for example, a function module in the base station in the embodiment shown in FIG. 4.

Figure 11:
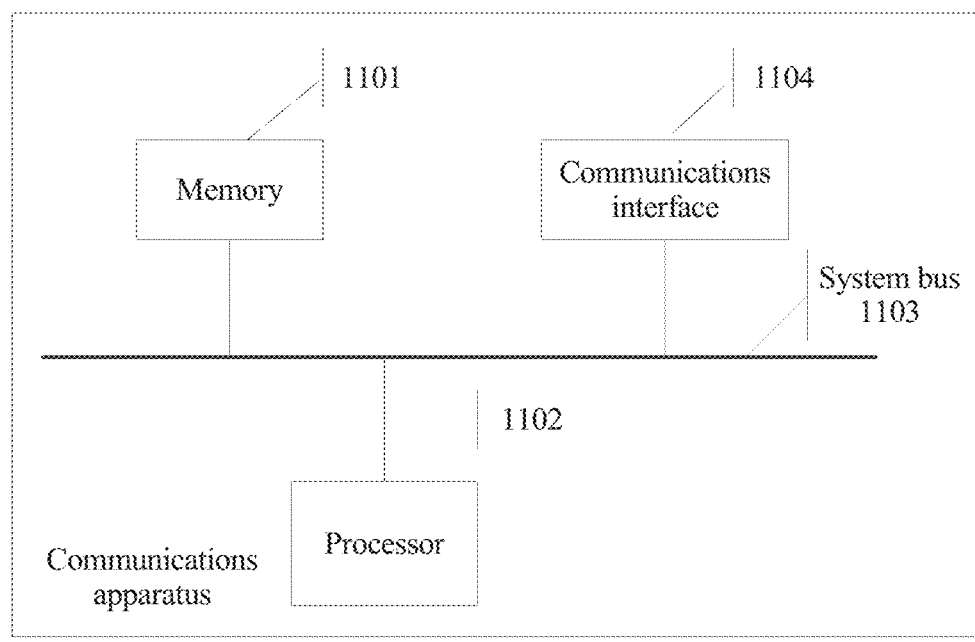

In a simple embodiment, a person skilled in the art may consider that either of the communications apparatus provided in the embodiment shown in FIG. 9 and the communications apparatus provided in the embodiment shown in FIG. 10 may be further implemented by using a structure shown in FIG. 11.

As shown in FIG. 11, a communications apparatus may include a memory 1101, a processor 1102, a system bus 1103, and a communications interface 1104. The processor 1102, the memory 1101, and the communications interface 1104 are connected by using the system bus 1103. The memory 1101 is configured to store a computer executable instruction. When the communications apparatus runs, the processor 1102 executes the computer executable instruction stored in the memory 1101, so that the communications apparatus performs the resource indication method provided in the embodiment shown in FIG. 4. For a specific resource indication method, refer to the foregoing descriptions and related descriptions in the accompanying drawings. Details are not described herein again.

Optionally, the communications apparatus provided in the embodiment shown in FIG. 11 may be an FPGA, an ASIC, a system on chip (system on chip, SoC), a CPU, a network processor (network processor, NP), a digital signal processing circuit (digital signal processor, DSP), or a micro control unit (micro controller unit, MCU), or may be a programmable controller (programmable logic device, PLD) or another integrated chip.

Figure 12:
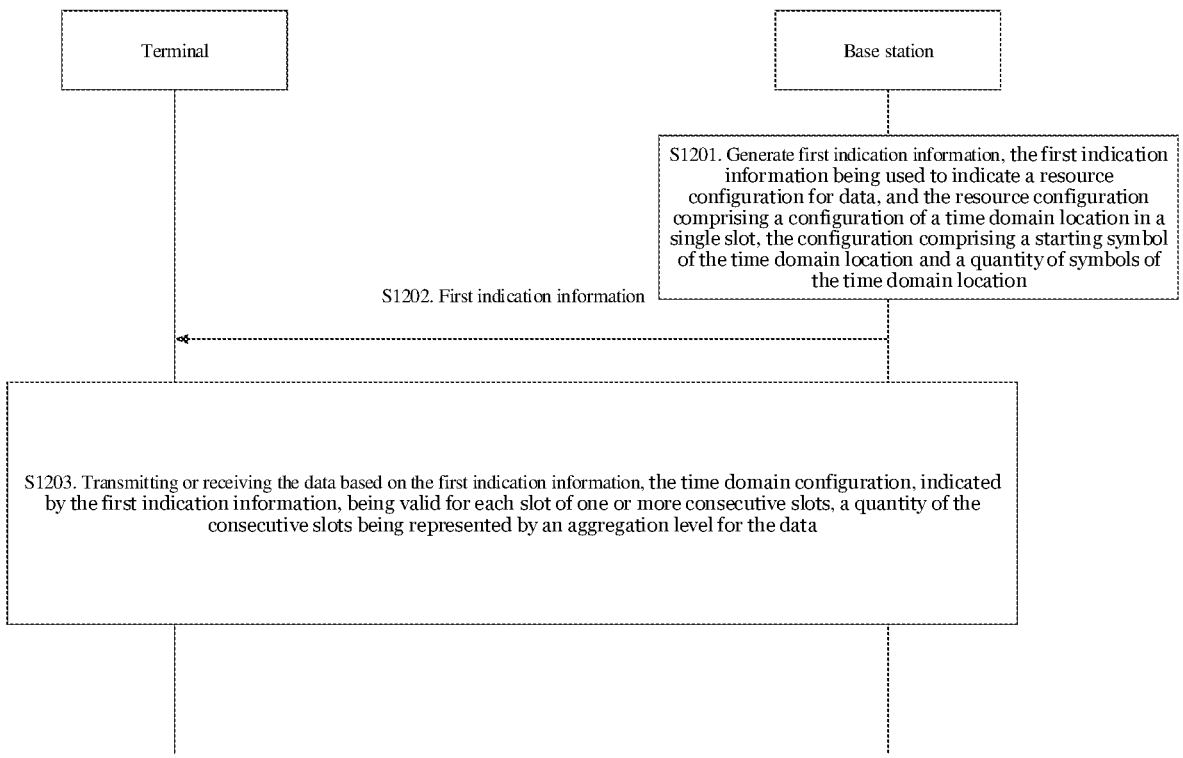
FIG. 12 is a flowchart of a resource indication method according to an embodiment of the present invention.

FIG. 12 is a flowchart of a resource indication method according to an embodiment of the present invention. In Step S1201, the base station generates first indication information, the first indication information being used to indicate a resource configuration for data, and the resource configuration comprising a configuration of a time domain location in a single slot, the configuration comprising a starting symbol of the time domain location and a quantity of symbols of the time domain location. In Step S1202, the terminal receives the first indication information from the base station. In Step S1203, the terminal transmits or receives the data based on the first indication information, the time domain configuration, indicated by the first indication information, being valid for each slot of one or more consecutive slots, a quantity of the consecutive slots being represented by an aggregation level for the data.

In addition, the communications apparatus provided in the embodiment shown in FIG. 9 may be alternatively implemented in another form. For example, the communications apparatus includes a receiving unit and a processing unit. The receiving unit may be configured to perform S42 and S44 in the embodiment shown in FIG. 4, and/or configured to support another process of the technology described in this specification. The processing unit may be configured to perform S43 in the embodiment shown in FIG. 4, and/or configured to support another process of the technology described in this specification. All related content of the steps in the foregoing method embodiments may be cited in function descriptions of corresponding function modules. Details are not described herein.

The communications apparatus provided in the embodiment shown in FIG. 10 may be alternatively implemented in another form. For example, the communications apparatus includes a sending unit and a processing unit. The sending unit may be configured to perform S42 and S44 in the embodiment shown in FIG. 4, and/or configured to support another process of the technology described in this specification. The processing unit may be configured to perform S41 in the embodiment shown in FIG. 4, and/or configured to support another process of the technology described in this specification. All related content of the steps in the foregoing method embodiments may be cited in function descriptions of corresponding function modules. Details are not described herein.

Because the communications apparatuses provided in the embodiments of the present invention may be configured to perform the foregoing resource indication methods, for technical effects that can be achieved by the communications apparatuses, refer to the foregoing method embodiments. Details are not described herein.

The embodiments of the present invention are described with reference to the flowcharts and/or block diagrams of the method, the device (system), and the computer program product according to the embodiments of the present invention. It should be understood that computer program instructions may be used to implement each process in the flowcharts, and/or each block in the block diagrams, and a combination of a process in the flowcharts and a block in the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specified function in one or more processes in the flowcharts and/or in one or more blocks in the block diagrams.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instruction is loaded and executed on a computer, all or some of the procedures or functions according to the embodiments of the present invention are generated. The computer may be a general-purpose computer, a dedicated computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

Apparently, a person skilled in the art can make various modifications and variations to the embodiments of the present invention without departing from the spirit and scope of this application. In this way, this application is intended to cover these modifications and variations to the embodiments of the present invention provided that they fall within the scope of the claims of this application and equivalent technologies thereof.

What is claimed is:

1. A communication method, comprising:
receiving, by a communications apparatus, first indication information from a base station, the first indication information indicating a resource configuration that indicates one or more scheduled symbols for a data communication on a data channel, and the resource configuration comprising a configuration of a time domain location in a single slot of more than one consecutive slots;
receiving, by the communications apparatus from the base station, information indicating a type of a slot scheduled for the data channel, wherein the type of the slot is a self-contained slot type, a slot for downlink transmission only type, or a slot for uplink transmission only type; and
performing, by the communications apparatus, the data communication on the data channel based on an aggregation level for the data communication and an intersection set of a symbol indicated by the first indication information indicating the resource configuration and the information indicating the type of the slot, the resource configuration indicating the one or more scheduled symbols for the data communication on the data channel being valid for each slot of the more than one consecutive slots, a quantity of the consecutive slots being represented by the aggregation level for the data communication;
wherein the configuration of the time domain location in the single slot comprises a starting symbol of the time domain location and a quantity of symbols of the time domain location.

2. The method according to claim 1, further comprising: receiving an indication of the aggregation level for the data communication.

3. The method according to claim 2, wherein the aggregation level for the data communication is indicated by indicating the quantity of the slots for the data communication.

4. The method according to claim 1, wherein the data communication is downlink data communication or uplink data communication.

5. The method according to claim 1, wherein the first indication information is carried in one field in downlink control information (DCI) received from the base station.

6. The method according to claim 1, wherein the first indication information further indicates the aggregation level for the data communication.

7. The method according to claim 6, wherein the first indication information is carried in one field in downlink control information (DCI) received from the base station, and a value of the first indication information is one of a plurality of values wherein each of the plurality of values corresponds to one value of the starting symbol, one value of the quantity of symbols and one value of the aggregation level.

8. A communications apparatus, comprising a memory, a communications interface, and a processor, wherein:
the memory is configured to store computer executable program code;
the processor is coupled to the memory and the communications interface; and
the program code stored in the memory comprises an instruction, and when the processor executes the instruction, the instruction causes the communications apparatus to perform the following:
receiving first indication information from a base station, wherein the first indication information indicates a resource configuration that indicates one or more scheduled symbols for a data communication on a data channel, and wherein the resource configuration comprises a configuration of a time domain location in a single slot of more than one consecutive slots;
receiving, from the base station, information indicating a type of a slot scheduled for the data channel, wherein the type of the slot is a self-contained slot type, a slot for downlink transmission only type, or a slot for uplink transmission only type; and
performing the data communication on the data channel based on an aggregation level for the data communication and an intersection set of a symbol indicated by based on the first indication information indicating the resource configuration and the information indicating the type of the slot, wherein the resource configuration indicating the one or more scheduled symbols for the data communication on the data channel is valid for each slot of the more than one consecutive slots, wherein a quantity of the consecutive slots is represented by the aggregation level for the data communication;
wherein the configuration of the time domain location in the single slot comprises a starting symbol of the time domain location and a quantity of symbols of the time domain location.

9. The apparatus according to claim 8, wherein the program code further comprises a second instruction to cause the apparatus perform the following:
receiving an indication of the aggregation level for the data communication.

10. The apparatus according to claim 9, wherein the aggregation level for the data communication is indicated by indicating the quantity of the slots for the data communication.

11. The apparatus according to claim 8, wherein the data communication is downlink data communication or uplink data communication.

12. The apparatus according to claim 8, wherein the first indication information is carried in one field in downlink control information (DCI) received from the base station.

13. The apparatus according to claim 8, wherein the first indication information further indicates the aggregation level for the data communication.

14. The apparatus according to claim 13, wherein the first indication information is carried in one field in downlink control information (DCI) received from the base station, and a value of the first indication information is one of a plurality of values wherein each of the plurality of values corresponds to one value of the starting symbol, one value of the quantity of symbols and one value of the aggregation level.

15. A non-transitory computer readable storage medium, wherein the medium stores an instruction, which, when executed by a processor, cause the processor perform the following:
receiving first indication information from a base station, wherein the first indication information indicates a resource configuration that indicates one or more scheduled symbols for a data communication on a data channel, and the resource configuration comprises a configuration of a time domain location in a single slot of more than one consecutive slots;
receiving, from the base station, information indicating a type of a slot scheduled for the data channel, wherein the type of the slot is a self-contained slot type, a slot for downlink transmission only type, or a slot for uplink transmission only type; and
performing the data communication on the data channel based on an aggregation level for the data communication and an intersection set of a symbol indicated by the first indication information indicating the resource configuration and the information indicating the type of the slot, wherein the resource configuration indicating the one or more scheduled symbols for the data communication on the data channel is valid for each slot of the more than one consecutive slots, and wherein a quantity of the consecutive slots is represented by the aggregation level for the data communication;
wherein the configuration of the time domain location in the single slot comprises a starting symbol of the time domain location and a quantity of symbols of the time domain location.

16. The non-transitory computer readable storage medium according to claim 15, wherein the medium further stores a second instruction, which, when executed by the processor, cause the processor perform the following:
receiving an indication of the aggregation level for the data communication.

17. The non-transitory computer readable storage medium according to claim 16, wherein the aggregation level for the data communication is indicated by indicating the quantity of the slots for the data communication.

18. The non-transitory computer readable storage medium according to claim 15, wherein the data communication is downlink data communication or uplink data communication.

19. The non-transitory computer readable storage medium according to claim 15, wherein the first indication information further indicates the aggregation level for the data communication.

20. The non-transitory computer readable storage medium according to claim 19, wherein the first indication information is carried in one field in downlink control information (DCI) received from the base station, and a value of the first indication information is one of a plurality of values wherein each of the plurality of values corresponds to one value of the starting symbol, one value of the quantity of symbols and one value of the aggregation level.

21. The non-transitory computer readable storage medium according to claim 15, wherein the first indication information is carried in one field in downlink control information (DCI) received from the base station.

22. A communication method, comprising:
transmitting, by a communications apparatus, first indication information to a terminal, the first indication information indicating a resource configuration that indicates one or more scheduled symbols for a data communication on a data channel, and the resource configuration comprising a configuration of a time domain location in a single slot of more than one consecutive slots;
transmitting, by the communications apparatus, information indicating a type of a slot scheduled for the data channel, wherein the type of the slot is a self-contained slot type, a slot for downlink transmission only type, or a slot for uplink transmission only type; and
performing, by the communications apparatus, the data communication on the data channel based on an aggregation level for the data communication and an intersection set of a symbol indicated by the first indication information indicating the resource configuration and the information indicating the type of the slot, the resource configuration indicating the one or more scheduled symbols for the data communication on the data channel being valid for each slot of the more than one consecutive slots, a quantity of the consecutive slots being represented by the aggregation level for the data communication;
wherein the configuration of the time domain location in the single slot comprises a starting symbol of the time domain location and a quantity of symbols of the time domain location.

23. The method according to claim 22, further comprising:
transmitting, by the communications apparatus, an indication of the aggregation level for the data communication.

24. The method according to claim 22, wherein the first indication information further indicates the aggregation level for the data communication.

25. The method according to claim 22, wherein the first indication information is carried in one field in downlink control information (DCI) transmitted by the communications apparatus, and a value of the first indication information is one of a plurality of values wherein each of the plurality of values corresponds to one value of the starting symbol, one value of the quantity of symbols and one value of the aggregation level.

26. The method according to claim 22, wherein the data communication is downlink data communication or uplink data communication.

27. A communications apparatus, comprising a memory, a communications interface, and a processor, wherein:

the memory is configured to store computer executable program code;
the processor is coupled to the memory and the communications interface; and
the program code stored in the memory comprises an instruction, and when the processor executes the instruction, the instruction causes the communications apparatus to perform the following:
transmitting first indication information to a terminal, the first indication information indicating a resource configuration that indicates one or more scheduled symbols for a data communication on a data channel, and the resource configuration comprising a configuration of a time domain location in a single slot of more than one consecutive slots;
transmitting information indicating a type of a slot scheduled for the data channel, wherein the type of the slot is a self-contained slot type, a slot for downlink transmission only type, or a slot for uplink transmission only type; and
performing the data communication on the data channel based on an aggregation level for the data communication and an intersection set of a symbol indicated by the first indication information indicating the resource configuration and the information indicating the type of the slot, the resource configuration indicating the one or more scheduled symbols for the data communication on the data channel being valid for each slot of the more than one consecutive slots, a quantity of the consecutive slots being represented by the aggregation level for the data communication;
wherein the configuration of the time domain location in the single slot comprises a starting symbol of the time domain location and a quantity of symbols of the time domain location.

28. The apparatus according to claim 27, wherein the program code further comprises a second instruction to cause the apparatus perform the following:
transmitting an indication of the aggregation level for the data communication.

29. The apparatus according to claim 27, wherein the first indication information further indicates the aggregation level for the data communication.

30. The apparatus according to claim 29, wherein the first indication information is carried in one field in downlink control information (DCI) transmitted by the communications apparatus, and a value of the first indication information is one of a plurality of values wherein each of the plurality of values corresponds to one value of the starting symbol, one value of the quantity of symbols and one value of the aggregation level.

31. The apparatus according to claim 27, wherein the data communication is downlink data communication or uplink data communication.

* * * * *

UNITED STATES PATENT AND TRADEMARK OFFICE
CERTIFICATE OF CORRECTION

PATENT NO. : 11,490,364 B2
APPLICATION NO. : 16/672046
DATED : November 1, 2022
INVENTOR(S) : Ting Wang Page 1 of 1

It is certified that error appears in the above-identified patent and that said Letters Patent is hereby corrected as shown below:

In the Claims

Claim 8, Column 39, Line 39; delete "based on".

Signed and Sealed this
Thirteenth Day of December, 2022

Katherine Kelly Vidal
*Director of the United States Patent and Trademark Office*